US008628725B2

(12) United States Patent
Gabriel et al.

(10) Patent No.: US 8,628,725 B2
(45) Date of Patent: Jan. 14, 2014

(54) PRODUCTION OF HYDROGEN FROM WATER USING A THERMOCHEMICAL COPPER-CHLORINE CYCLE

(75) Inventors: Kamiel Samy Gabriel, Whitby (CA); Zhaolin Wang, Whitby (CA); Greg Naterer, Whitby (CA)

(73) Assignee: University of Ontario Institute of Technology, Oshawa, Ontario (CA)

( * ) Notice: Subject to any disclaimer, the term of this patent is extended or adjusted under 35 U.S.C. 154(b) by 877 days.

(21) Appl. No.: 12/292,722

(22) Filed: Nov. 25, 2008

(65) Prior Publication Data

US 2010/0129287 A1    May 27, 2010

(51) Int. Cl.
*B01J 8/22*    (2006.01)
*C25C 1/12*    (2006.01)

(52) U.S. Cl.
USPC .......................... 422/141; 422/139; 205/574

(58) Field of Classification Search
USPC .................................. 422/139, 141; 205/574
See application file for complete search history.

(56) References Cited

U.S. PATENT DOCUMENTS

| | | | | |
|---|---|---|---|---|
| 2,503,703 | A * | 4/1950 | Bergstrom ..................... | 422/216 |
| 3,919,400 | A * | 11/1975 | Bonsack ......................... | 423/502 |
| 4,988,486 | A * | 1/1991 | Harris et al. .................. | 422/605 |
| 2008/0207979 | A1* | 8/2008 | Parosa .......................... | 588/310 |
| 2010/0025260 | A1 | 2/2010 | Naterer et al. | |

OTHER PUBLICATIONS

Schultz, K., Herring, S., Lewis M., Summers, W., "The Hydrogen Reaction", Nuclear Engineering International, vol. 50, pp. 10-19, 2005.

Rosen, M. A., "Thermodynamic Comparison of Hydrogen Production Processes," International Journal of Hydrogen Energy, vol. 21, No. 5, pp. 349-365, 1996.

Sadhankar, R. R., Li, J, Li, H., Ryland, D.K., Suppiah, S. "Future Hydrogen Production Using Nuclear Reactors", Engineering Institute of Canada-Climate Change Technology Conference, Ottawa, May 2006.

Sadhankar, R. R., "Leaveraging Nuclear Research to Support Hydrogen Economy", 2nd Green Energy Conference, Oshawa, Jun. 2006.

(Continued)

*Primary Examiner* — Nicholas A Smith
(74) *Attorney, Agent, or Firm* — Norton Rose Fulbright Canada LLP

(57) ABSTRACT

A system for producing hydrogen gas from water decomposition using a thermochemical CuCl cycle, the improvement comprising the use of an insulated hydrogen production reactor comprising a reaction chamber and a separation chamber; the reaction chamber having a hydrogen chloride gas inlet and a solid copper inlet; one or more levels provided in the reaction chamber, the number of which is dependant on production scale and pressure drop; each level comprising a perforated plate with associated filter media, the perforations of the plate and media being of decreasing size from top to bottom of the reaction chamber, and being sized to permit downward flow of the hydrogen gas and molten CuCl products, as well as the HCL gas reactant, and to prevent entrainment of solid copper in the molten CuCl; the separation chamber being located below the reaction chamber and being of greater cross section than the reaction chamber and comprising a first hydrogen removal and entrained copper removal zone and a second molten CuCl removal zone; removal of the reaction products being controlled so as to substantially decrease the amount of entrained copper in the molten CuCl; and the first zone having outlets for removal of hydrogen gas and entrained copper particles, with the second zone having an outlet for removal of molten CuCl.

27 Claims, 11 Drawing Sheets

(56) References Cited

OTHER PUBLICATIONS

Lewis, M. A., Serban, M., Basco, J. K, "Hydrogen Production at <550° C Using a Low Temperature Thermochemical Cycle", ANS/ENS Exposition, New Orleans, Nov. 2003.

Sakurai, M., Nakajima, H., Amir, R., Onuki, K. Shimizu, S., "Experimental Study on Side-Reaction Occurrence Condition in the Iodine-Sulfur Thermochemical Hydrogen Production Process", International Journal of Hydrogen Energy, vol. 23, pp. 613-619, 2000.

Shultz, K., "Thermochemical Production of Hydrogen from Solar and Nuclear Energy", Technical Report for the Stanford Global Climate and Energy Project, General Atomics, San Diego, CA, 2003.

Doctor, R. D., Matonis, D. T., Wade, D. C, "Hydrogen Generation Using a Calcium-Bromine Thermochemical Water-splitting cycle", Paper ANL/ES/CP-111623, OECD 2nd Information Exchange Meeting on Nuclear Production of Hydrogen, Argonne, IL, Oct. 2-3, 2003.

Paul Pickard, "Sulfur-Iodine Thermochemical Cycle", DOE Hydrogen Production Report, U.S. Department of Energy Labs, May 17, 2006.

Office of Technology Policy, US Department of Commerce, "Fuel Cell Vehicles: Race to a New Automative Future", Jan. 2003.

Suppiah, S., Li, J., Sadhankar, R., Kutchcoskie, K,J., Lewis, M., "Study of Hybrid Cu-Cl Cycle for Nuclear Hydrogen Production", Third Information Exchange Meeting on the Nuclear Production of Hydrogen, Orai, Japan, Oct. 2005.

Rosen, M.A. "Exergy Analysis of Hydrogen Production by Thermochemical Water Decomposition Using the Ispra Mark-10 Cycle", In Hydrogen Energy Prog. VIII: Proc. 8th World Hydrogen Energy Conference, ed. T.N. Veziroglu and P.K. Takahasi, Pergamon, Toronto, pp. 701-710, 1990.

* cited by examiner

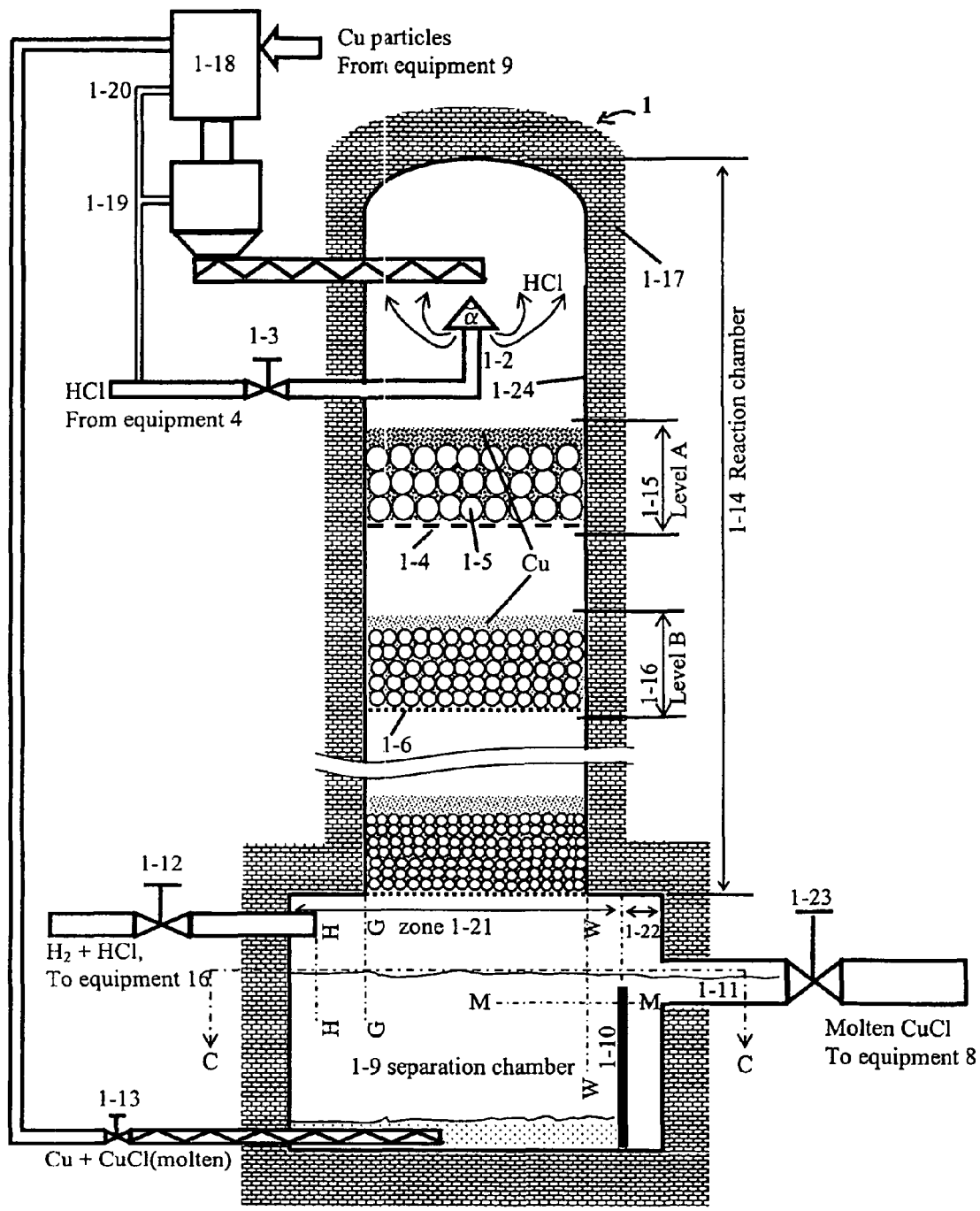
Figure 2.1

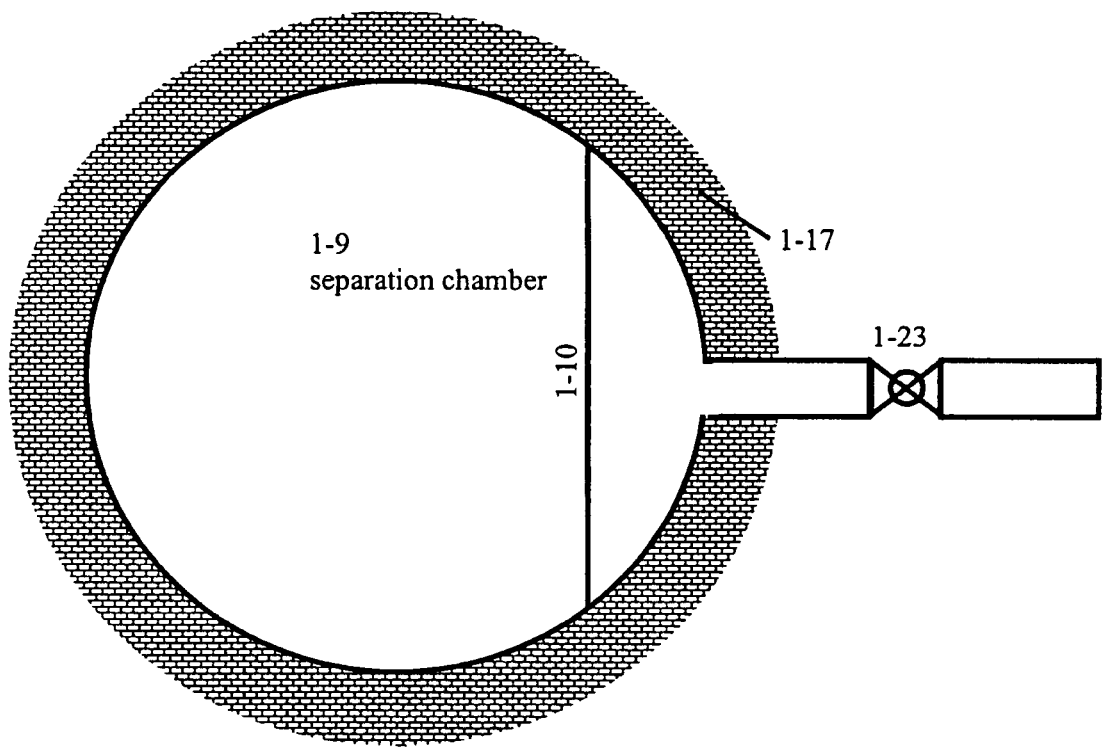
Figure 2.2

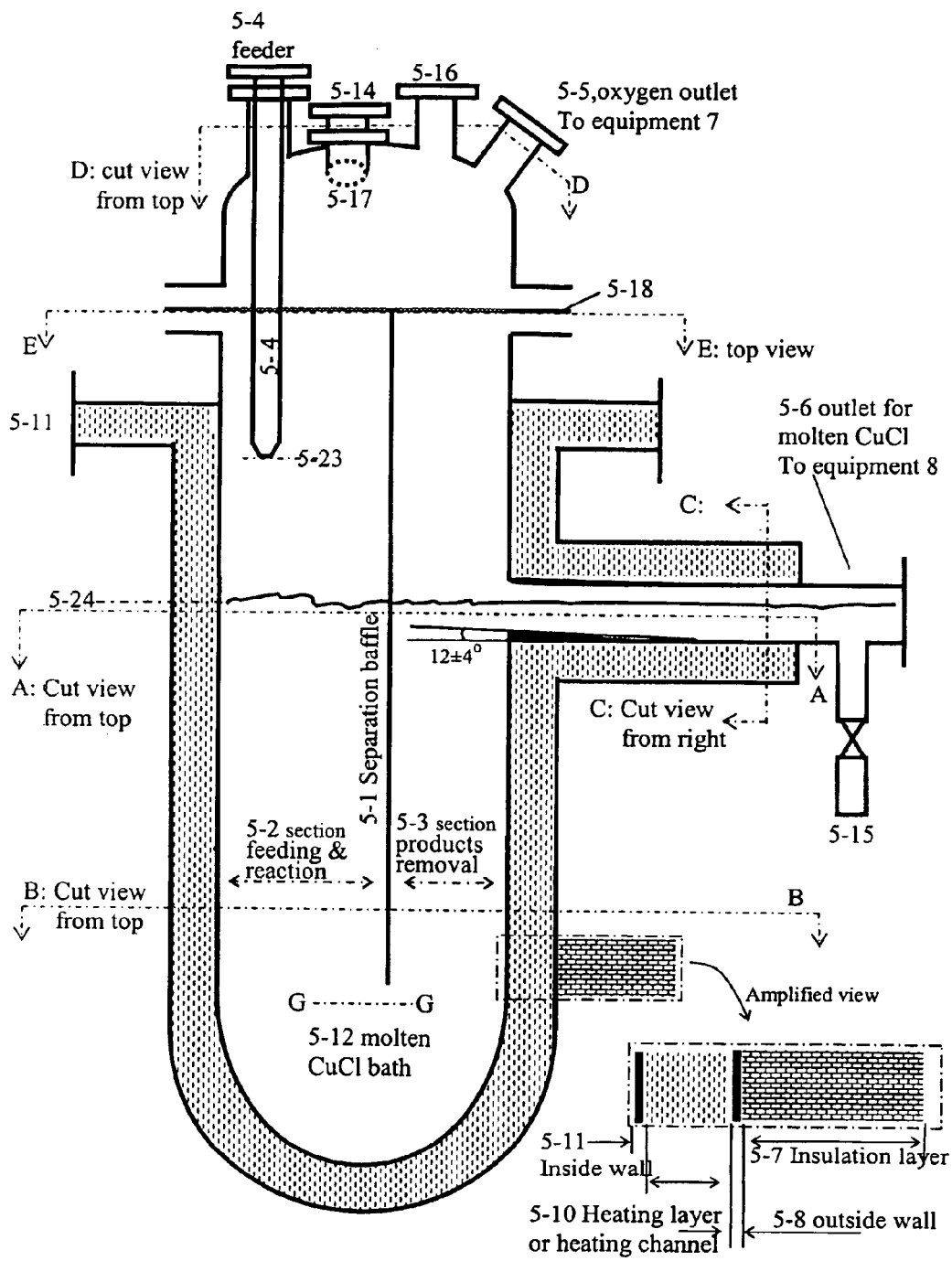
Figure 3.1

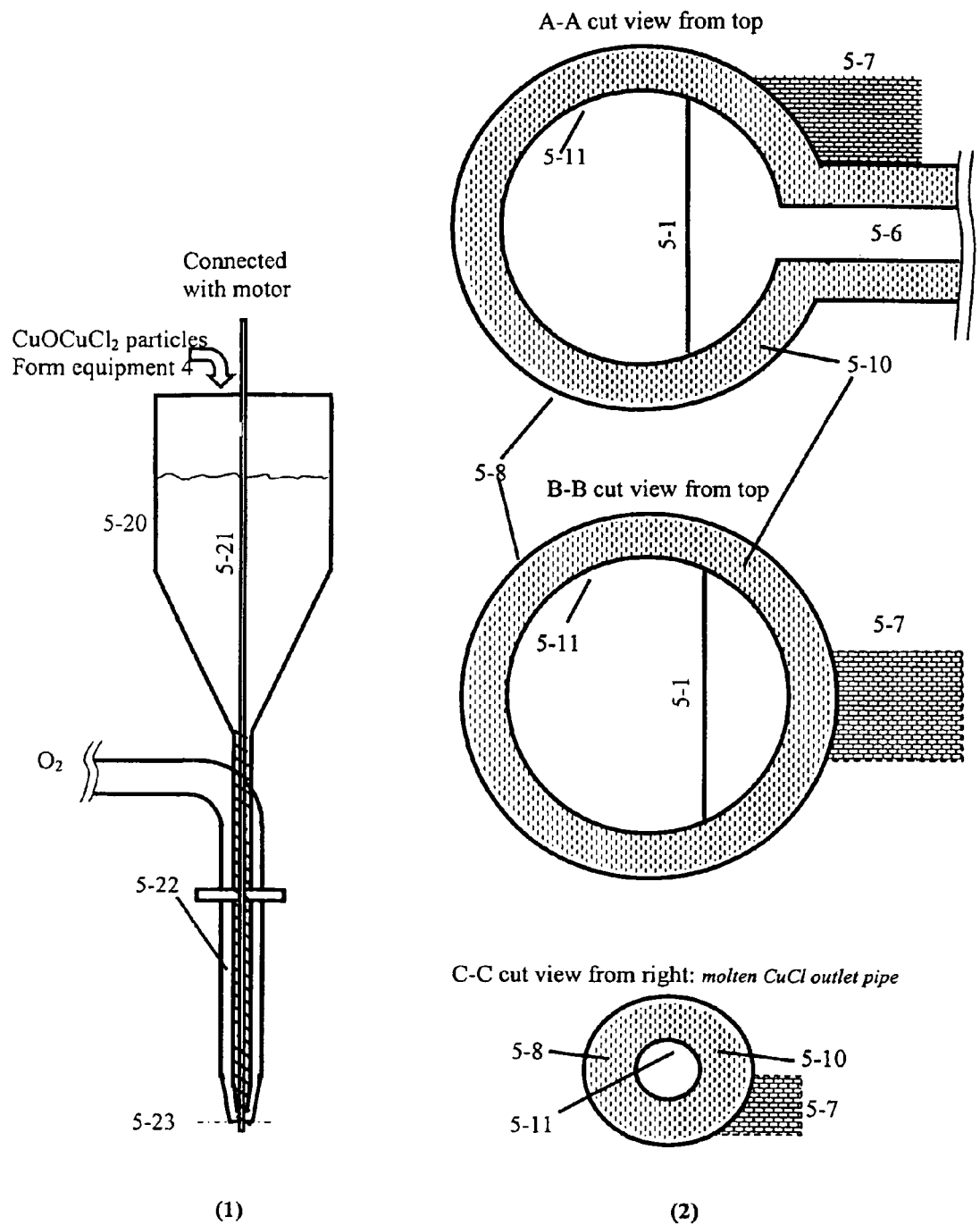
Figure 3.2

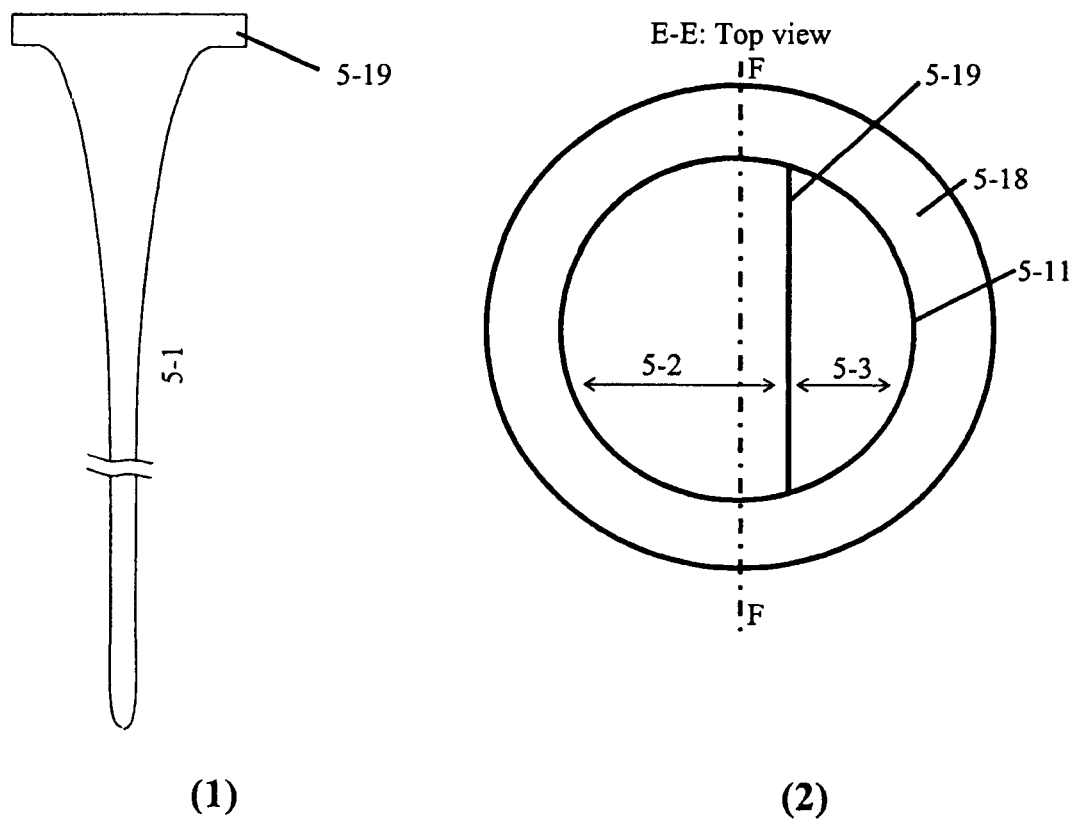
Figure 3.3

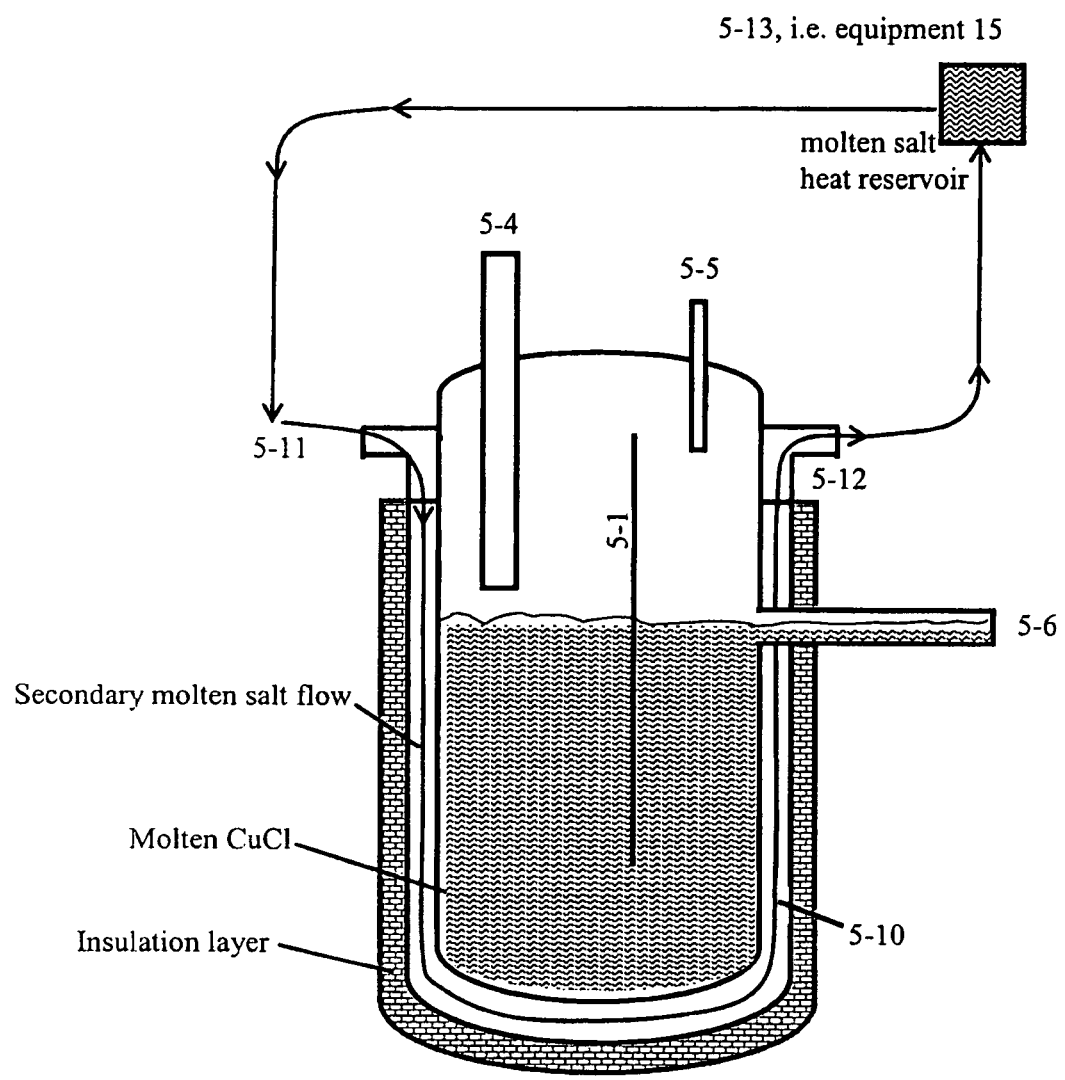
Figure 3.4

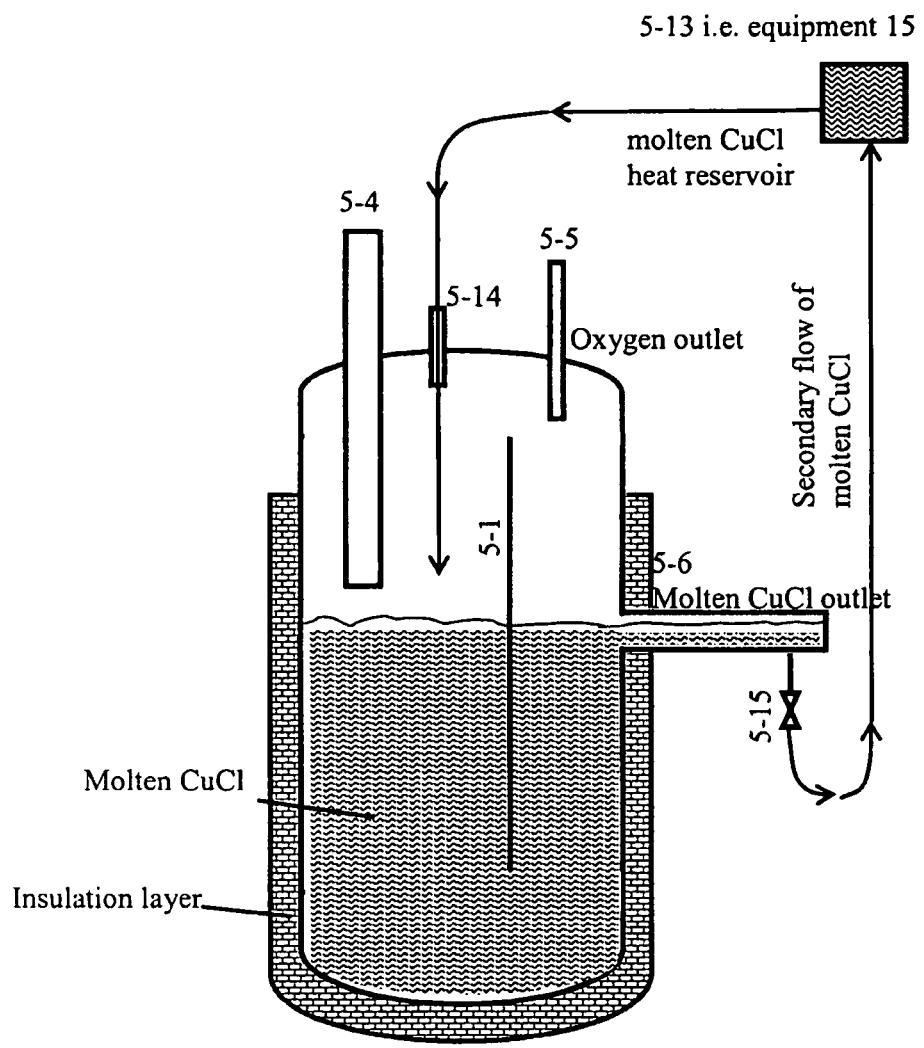
Figure 3.5

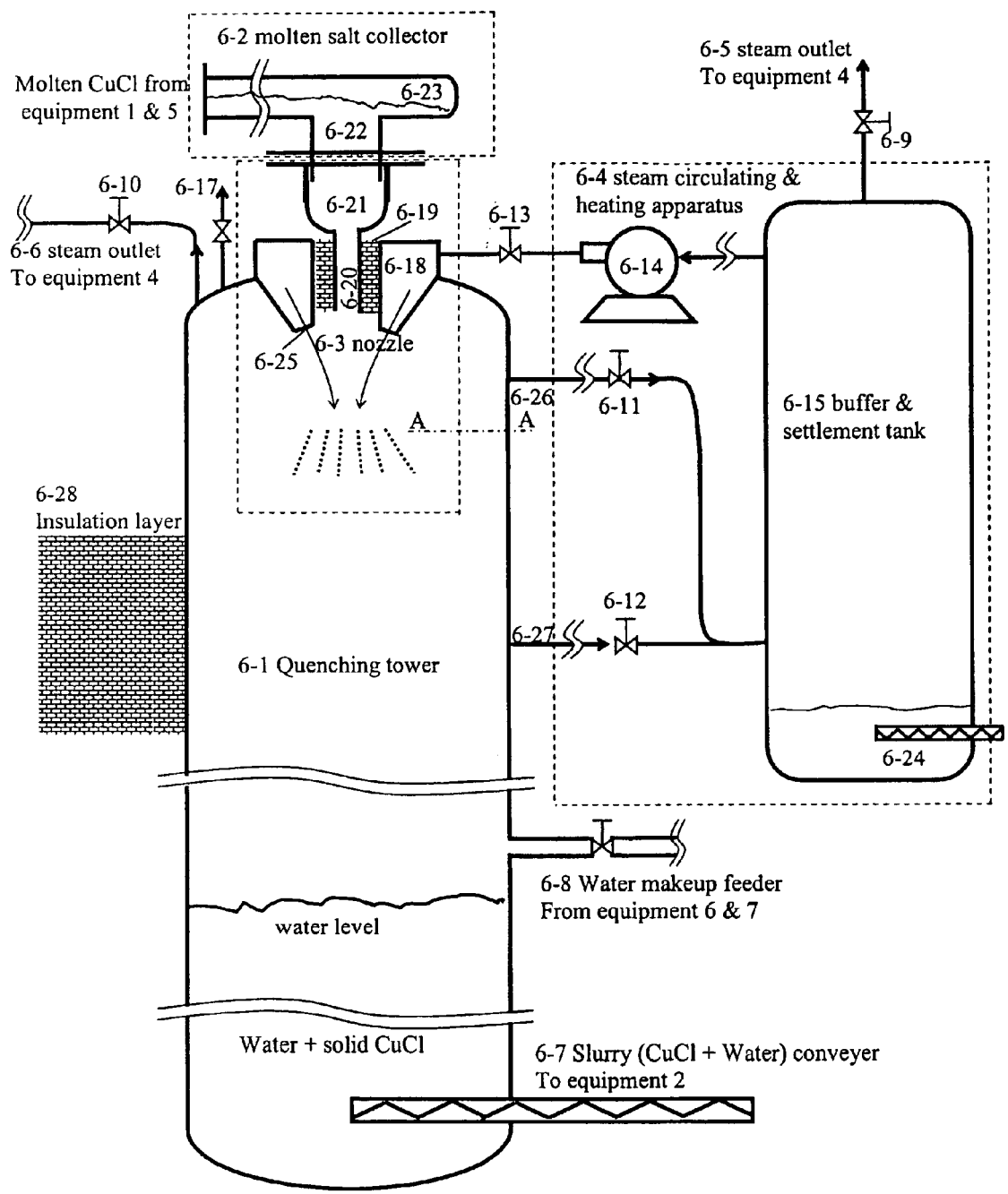
Figure 4.1

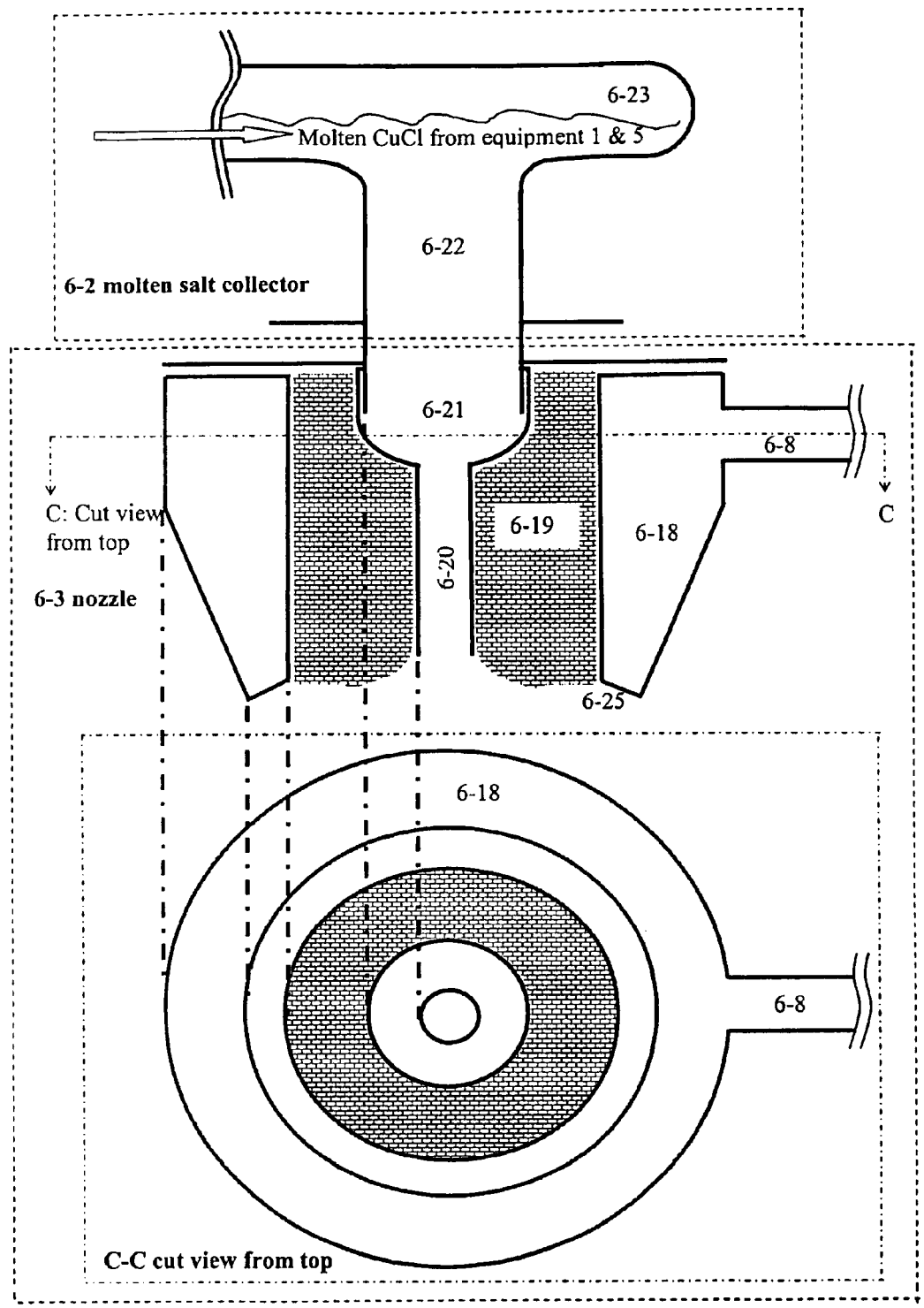
Figure 4.2

PRODUCTION OF HYDROGEN FROM WATER USING A THERMOCHEMICAL COPPER-CHLORINE CYCLE

FIELD OF THE INVENTION

This invention relates to a system, including apparatus for hydrogen gas production from water using a thermochemical cycle, such as a copper chlorine cycle. The apparatus encompasses a number of novel components including a hydrogen production reactor; an oxygen production reactor; and a molten salt processing apparatus which includes heat recovery equipment, all of which allow for scale up of the system to an industrial level.

BACKGROUND OF THE INVENTION

Hydrogen is widely believed to be the world's next generation fuel, since its oxidation does not emit greenhouse gases that contribute to climate change. Auto manufacturers are investing significantly in hydrogen vehicles. Other transportation vehicles, such as ships, trains and utility vehicles also represent promising opportunities for use of hydrogen fuel. Thus there is need for a reliable, safe, efficient and economic process for the production of hydrogen gas for fuel.

Electrolysis is a proven, commercial technology that separates water into hydrogen and oxygen using electricity. Net electrolysis efficiencies are typically about 24%. In contrast, thermochemical reactions to produce hydrogen using nuclear heat can achieve heat-to-hydrogen efficiencies up to about 50% [See Schultz, K., Herring, S., Lewis M., Summers, W., "The Hydrogen Reaction", *Nuclear Engineering International*, vol. 50, pp. 10-19, 2005 and Rosen, M. A., "Thermodynamic Comparison of Hydrogen Production Processes", *International Journal of Hydrogen Energy*, vol. 21, no. 5, pp. 349-365, 1996.]

A copper-chlorine (Cu—Cl) cycle has been identified by Atomic Energy of Canada Ltd. (AECL) [See Sadhankar, R. R., Li, J, Li, H., Ryland, D. K., Suppiah, S. "Future Hydrogen Production Using Nuclear Reactors", Engineering Institute of Canada—Climate Change Technology Conference, Ottawa, May, 2006 and Sadhankar, R. R., "Leveraging Nuclear Research to Support Hydrogen Economy", 2nd Green Energy Conference, Oshawa, June, 2006.] at its Chalk River Laboratories (CRL) as a highly promising cycle thermochemical for hydrogen production. Water is decomposed into hydrogen and oxygen through intermediate Cu—Cl compounds. Past studies at Argonne National Laboratory (ANL) have developed enabling technologies for the Cu—Cl thermochemical cycle, through an International Nuclear Energy Research Initiative (I-NERI), as reported by Lewis et al. [See 17. Lewis, M. A., Serban, M., Basco, J. K, "Hydrogen Production at <550° C. Using a Low Temperature Thermochemical Cycle", ANS/ENS Exposition, New Orleans, November, 2003.] The Cu—Cl cycle is well matched to Canada's nuclear reactors, since its heat requirement for high temperatures is adaptable to the Super-Critical Water Reactor (SCWR), which is being considered as Canada's Generation IV nuclear reactor.

Other countries (Japan, U.S. and France) are currently advancing nuclear technology for thermochemical hydrogen production [See Sakurai, M., Nakajima, H., Amir, R., Onuki, K., Shimizu, S., "Experimental Study on Side-Reaction Occurrence Condition in the Iodine-Sulfur Thermochemical Hydrogen Production Process", International Journal of Hydrogen Energy, vol. 23, pp. 613-619, 2000; Schultz, K., "Thermochemical Production of Hydrogen from Solar and Nuclear Energy", Technical Report for the Stanford Global Climate and Energy Project, General Atomics, San Diego, Calif., 2003; and Doctor, R. D., Matonis, D. T., Wade, D. C., "Hydrogen Generation Using a Calcium-Bromine Thermochemical Water-splitting Cycle", Paper ANL/ES/CP-111623, OECD 2nd Information Exchange Meeting on Nuclear Production of Hydrogen, Argonne, Ill., Oct. 2-3, 2003.]

The Sandia National Laboratory in the U.S. and CEA in France are developing a hydrogen pilot plant with a sulphur-iodine (S—I) cycle [See Pickard, P., Gelbard, F., Andazola, J., Naranjo, G., Besenbruch, G., Russ, B., Brown, L., Buckingham, R., Henderson, D., "Sulfur-Iodine Thermochemical Cycle", DOE Hydrogen Production Report, U.S. Department of Energy, Washington, D.C., 2005 Fuel Cell Vehicles: Race to a New Automotive Future, Office of Technology Policy, US Department of Commerce, January, 2003.] The Korean KAERI Institute is collaborating with China to produce hydrogen with their HTR-10 reactor. The Japan Atomic Energy Agency (JAEA) aims to complete a large S—I plant to produce 60,000 $m^3$/hr of hydrogen by 2020, which will be sufficient for about 1 million fuel cell vehicles [See Suppiah, S., Li, J., Sadhankar, R., Kutchcoskie, K. J., Lewis, M., "Study of Hybrid Cu—Cl Cycle for Nuclear Hydrogen Production", Third Information Exchange Meeting on the Nuclear Production of Hydrogen, Orai, Japan, October, 2005.] Several countries, participating in the Generation Iv International Forum plan to develop the technologies for co-generation of hydrogen by high-temperature thermochemical cycles and electrolysis, through multilateral collaborations [See Rosen, M. A., "Thermodynamic Analysis of Hydrogen Production by Thermochemical Water Decomposition using the Ispra Mark-10 Cycle", In Hydrogen Energy Prog. VIII: Proc. 8th World Hydrogen Energy Conference, ed. T. N. Veziroglu and P. K. Takahashi, Pergamon, Toronto, pp. 701-710, 1990.]

When compared to other methods of hydrogen production, the thermochemical Cu—Cl cycle has its own unique advantages, challenges, risks and limitations. Technical challenges include the transport of solids and electrochemical processes of copper electrowinning, which are not needed by other cycles such as the sulfur-iodine cycle. These processes are challenging due to solids injection/removal, which can block equipment operation and generate undesirable side reactions in downstream chemical reactors. Flow of solid materials can lead to increased maintenance costs, due to wear and increased downtime arising from blockage and unscheduled equipment failure. A technological risk involves the potential use of expensive new materials of construction that are needed to prevent corrosion of equipment surfaces. These include surfaces exposed to molten CuCl, spray drying of aqueous $CuCl_2$ and high-temperature HCl and $O_2$ gases. Additional operational challenges entail the steps of chemical separation (which increases complexity and costs) and phase separation (particles, gas, and liquids must be separated from each other in fluid streams leaving the reactors). As a result, the overall cycle efficiency becomes a limitation, wherein the Cu—Cl cycle must compete economically against other existing technologies of hydrogen production.

Despite these challenges and risks, the Cu—Cl cycle offers a number of key advantages over other cycles of thermochemical hydrogen production. The attractions include lower temperatures compared to other cycles like the S—I cycle. Heat input at temperatures less than 530° C. make it suitable for coupling to Canada's SCWR (Super-Critical Water Reactor; Generation IV nuclear reactor) and reduced demands on materials of construction. Other advantages are inexpensive raw materials and reactions that proceed nearly to completion without significant side reactions. Solids handling is required, but it is relatively minimal and it can be reduced by combining thermochemical and electrochemical steps together. Another key advantage is the cycle's ability to utilize low-grade waste heat from power plants, for various thermal processes within the cycle. However, before these advantages can be realized, further equipment scale-up is needed.

SUMMARY OF THE INVENTION

The present invention relates to reactors and vessels and heat coupling methods which are used in a closed loop of a copper-chlorine thermochemical cycle that produces hydrogen and oxygen by using energy from clean sources such as nuclear and solar. In this invention, the oxygen production, hydrogen production, molten salt processing, steam generation, heat recovery and auxiliary cells constitute novel aspects of the present invention which allow for the production of hydrogen and oxygen on a plant scale.

In one aspect of this invention there is provided a system for producing hydrogen gas from water decomposition using a thermochemical Cu—Cl cycle, the improvement comprising the use of an insulated hydrogen production reactor comprising a reaction chamber and a separation chamber; the reaction chamber having a hydrogen chloride gas inlet and a solid copper inlet; one or more levels provided in the reaction chamber, the number of which is dependant on production scale and pressure drop; each level comprising a perforated plate with associated filter media, the perforations of the plate and media being of decreasing size from top to bottom of the reaction chamber, and being sized to permit downward flow of the hydrogen gas and molten CuCl products, as well as the HCl, gas reactant, and to prevent entrainment of solid copper in the molten CuCl; the separation chamber being located below the reaction chamber and being of greater cross section than the reaction chamber and comprising a first hydrogen removal and entrained copper removal zone and a second molten CuCl removal zone; removal of the reaction products being controlled so as to substantially decrease the amount of entrained copper in the molten CuCl; and the first zone having outlets for removal of hydrogen gas and entrained copper particles, with the second zone having an outlet for removal of molten CuCl.

In a particular aspect of this disclosure, there is described an apparatus for the production of hydrogen gas from the thermal decomposition of water using a Cu—Cl cycle comprising: an upper reaction chamber opening into a lower separation chamber of greater cross section than the upper reaction chamber; separate inlets for a solid reactant and a gaseous reactant in the upper reaction chamber, the solid reactant inlet being in communication with a solid reactant feeder, the gaseous reactant inlet being in communication with an adjustable gaseous reactant feeder that provides gas at a higher pressure than the pressure in the reaction chamber; the reactants and the reaction products flowing downwardly and concurrently through a plurality of filter layers, each of the filter layers comprising packing materials arranged on a perforated plate or mesh support, with the dimensions of the packing materials, the perforations and the mesh decreasing in size from top to bottom, from layer to layer, so that a uniform pressure drop is provided through each layer; the lower separation chamber being divided into two separation zones by a separation baffle whereby products and reactants are separated by virtue of their respective densities and by gravity; a first separation zone having an upper outlet for removal of unreacted gaseous reactant and gaseous reaction product, and a lower outlet for removal of unconsumed solid reactant; and a second separation zone having a lower outlet for removal of molten reaction product; wherein the first and third outlets, and the separation baffle are not in the area of the separation chamber into which the reaction chamber opens, so that unconsumed solid reactant can fall freely to the bottom of the first separation zone in the separation chamber through the molten reaction product and be removed therefrom.

The above apparatus may be combined with a gas production reactor for the production of oxygen gas from water decomposition using a thermochemical Cu—Cl cycle comprising two major sections, a first reactants feeding and reaction section and a second products removal section; a feeder inlet for solid reactant in the first section, a second gas outlet at the top of the gas reactor and an outlet for hot liquid reaction product in the second section of the gas reactor, located at a position below the position of the feeder inlet for solid reactant; the first section extending into a base of the reactor and supplying heat to the reactor for the reaction; a hot liquid reaction product bath of the solid reaction product being maintained in the reactor to ensure high heat transfer rate and efficiency for the reaction.

In another aspect of this disclosure, there is described an apparatus for use in the production of hydrogen gas and oxygen gas from water decomposition using a thermochemical Cu—Cl Cycle comprising: a hydrogen gas generator operating in accordance with the following Equation (1):

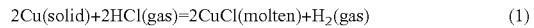

$$2Cu(solid)+2HCl(gas)=2CuCl(molten)+H_2(gas) \quad (1)$$

at a temperature in the range of about 380° C. to about 500° C. comprising: an upper reaction chamber opening into a lower separation chamber of greater cross section than the cross section of the upper reaction chamber; separate inlets for the solid Cu reactant and an adjustable dry HCl gas reactant in the upper reaction chamber, with the solid Cu reactant inlet being in communication with a feeder for solid Cu reactant, the dry HCl gaseous reactant inlet being in communication with a dry HCl gaseous reactant feeder that provides gas at a higher pressure than the pressure in the reaction chamber; the solid Cu and dry gaseous reactants and the reaction products $H_2$ and molten CuCl flowing downwardly and concurrently through a plurality of filter layers, each of the filter layers comprising packing materials arranged on a perforated plate or mesh support, with the dimensions of the packing materials, the perforations and the mesh decreasing in size from top to bottom of the plurality of layers, so that a uniform pressure drop is provided through each layer; the lower separation chamber the lower separation chamber being divided into two separation zones by a separation baffle whereby products and reactants are separated by virtue of their respective densities and by gravity; a first separation zone having an upper outlet for removal of unreacted HCl gas and hydrogen gas, and a lower outlet for removal of unconsumed solid copper; and a second separation zone having an outlet for removal of molten CuCl salt; wherein the first and third outlets, and the separation baffle are not in the area of the separation chamber into which the reaction chamber opens, so that unconsumed solid copper can fall freely to the bottom of the first separation zone in the separation chamber through the molten CuCl salt and be removed therefrom; a quenching tower wherein steam generation and molten salt processing can be conducted such that water at ambient temperature can be exposed to molten CuCl to produce a slurry of solid CuCl and steam; a reactor for oxygen gas production operated in accordance with Equation (5) of the thermochemical Cu—Cl cycle:

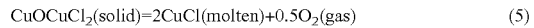

$$CuOCuCl_2(solid)=2CuCl(molten)+0.5O_2(gas) \quad (5)$$

the $CuOCuCl_2$ (solid) heated at a temperature of from about 500° C. to about 530° C.; the reactor comprising two major sections, a first reactants feeding and reaction section and a second products removal section defined by a separation baffle; a feeder inlet for reactant particles in the first section, a gas outlet at the top of the reactor and an outlet for liquid reactant in the second section of the reactor, the liquid reactant outlet being located at a position below the position of the feeder inlet for solid particles, and above the base of the separation baffle; the first section extending into the base of the production reactor and supplying heat to the production reactor for the reaction; a molten salt bath of the CuCl reaction product being maintained in the oxygen gas production reactor to ensure high heat transfer rate and efficiency for the reaction; and an apparatus for steam circulating and heating comprising a buffer and a settlement tank associated with a nozzle, for receiving steam from the tower steam chamber, in which the steam can flow downwardly and spin in the steam chamber to produce turbulent steam flow which can split downwardly flowing molten CuCl product entering the quenching tower, which can be sprayed or atomized, and the steam extracts more heat from the molten CuCl product. Additionally, there may be added an apparatus of comprising a quenching tower for receiving a hot liquid product, a generator for producing steam in the tower, and a supply of water at ambient temperature, the steam and the hot liquid reaction product being processed and then exposed to the ambient temperature water to produce a slurry of solid reaction product and steam. Another addition is a steam circulating and heating apparatus comprising a buffer and a settlement tank. The settlement tank permits the steam under pressure from the tower to be circulated to a steam chamber with an associated nozzle, in which the steam can flow downwardly and spin in the steam chamber to produce turbulent steam flow to split the downwardly flowing hot liquid reaction product entering the quenching tower, which can be sprayed or atomized, whereby the steam extracts more heat from the hot liquid reaction product.

The Cu—Cl cycle may comprise a five step process comprising the steps of 1) reacting Cu and dry HCl gas at a temperature of about 450° C. to obtain hydrogen gas and molten CuCl salt; 2) subjecting solid Cu—Cl and HCl to electrolysis at a temperature of about 70 to about 90° C. to obtain Cu and an aqueous slurry containing HCl and $CuCl_2$; 3) heating the aqueous slurry obtained from step 2) at a temperature of from about 375 to about 450° C. to obtain solid $CuCl_2$ and $H_2O$/HCl vapours; 4) heating the solid $CuCl_2$ and water to obtain solid $CuOCuCl_2$ and gaseous HCl; and 5) heating the solid $CuOCuCl_2$ obtained in step 4) at a temperature of from about 500 to about 530° C. to obtain molten CuCl salt and oxygen gas.

Alternatively, the Cu—Cl cycle may comprise a four step process comprising the steps of 1) reacting Cu and dry HCl gas at a temperature of about 450° C. to obtain hydrogen gas and molten CuCl salt; 2) subjecting solid CuCl and HCl to electrolysis at a temperature of about 70 to about 90° C. to obtain Cu and an aqueous slurry containing HCl and $CuCl_2$; 3) heating the aqueous slurry containing HCl and $CuCl_2$ at a temperature of from about 375 to about 450° C. to obtain solid $CuOCuCl_2$ and gaseous HCl; and 4) heating the solid $CuOCuCl_2$ at a temperature of from about 500 to about 530° C. to obtain molten CuCl salt and oxygen gas.

A further alternative allows the use of a Cu—Cl cycle that comprises a three step process comprising the steps of 1) reacting Cu and dry HCl gas at a temperature of about 450° C. to obtain hydrogen gas and molten CuCl salt; 2) subjecting solid CuCl and HCl to electrolysis at a temperature of about 70 to about 90° C. to obtain Cu and an aqueous slurry containing HCl and $CuCl_2$; 3) heating the aqueous slurry containing HCl and $CuCl_2$ at a temperature of from about 500 to about 530° C. to obtain molten CuCl salt and oxygen gas.

In another form of the invention the system may utilize the improvement comprising the use of an insulated oxygen production reactor comprising two major sections, a first reactants feeding and reaction section and a second products removal section; a feeder inlet for $CuOCuCl_2$ reactant particles in the first section and an oxygen gas outlet at the top of the reactor and an outlet for molten CuCl in the second section of the reactor, located at a position below the position of the feeder inlet for $CuOCuCl_2$; the first section extending into the base of the reactor and supplying heat to the reactor for the reaction; a molten salt bath of the reaction product CuCl being maintained in the reactor to ensure high heat transfer rate and efficiency for the reaction.

In another form of the invention, the feeder inlet has an associated feeder which comprises a hopper for the $CuOCuCl_2$ particles, a screw to force the particles into the first section of the reactor, and a double shell structure for the feeder in which lower temperature oxygen produced from the reaction is allowed to flow through to ensure that the particles remain in solid form in the feeder and to prevent reverse flow of the reaction products into the feeder. The heat for the reactor may be provided by at least one of the following: a heating jacket, a secondary molten salt/steam flow from inside the reactor to a double shell surrounding the reactor, a secondary flow of molten CuCl salt from outside the reactor; and a flow of steam to the heating channel. The secondary molten salt/steam flow may circulate in the heating channel of the reactor and flow out and to a molten salt heating reservoir and then back to the heating channel of the reactor.

In yet another form of the invention, the improvement may comprise feeding the molten CuCl into a quenching tower where steam generation and molten salt processing are conducted such that water at ambient temperature is exposed to molten CuCl to produce steam and a slurry of solid CuCl and water.

The quenching tower may be insulated and have an associated molten salt collector in which molten CuCl streams are collected together before being fed into a top portion of the quenching tower; steam outlets are provided in a top portion of the quenching tower, a slurry outlet is provided in a base portion of the tower, and a water make-up inlet is provided in the quenching tower. The system may further comprise a steam circulating and heating apparatus comprising a buffer and settlement tank, and the tank permits the steam under pressure from the tower to be circulated to a steam chamber associated with a nozzle, the steam flowing downwardly and spinning in the steam chamber to produce turbulent steam splitting the downwardly flowing molten CuCl entering the quenching tower, which is sprayed or atomized, and the steam extracts more heat from the molten CuCl.

In another form of the invention, each of the filter media may comprise layers of packings of inert materials or may comprise a copper aggregation which provides at least some of the Cu in the reaction. The packings may be balls or cylinders or rings made of suitable material for the reaction conditions.

In another form of the invention an excess quantity of reactants HCl and Cu are used whereby heat produced in the system can be recovered efficiently without employing extra recovery steps. The excess amount of HCl may be up to 8 times the stoichiometric value and the excess amount of Cu may be up to 2.5 times the stoichiometric value.

It should be noted that any of the various forms of the invention may be used alone or in combination in a CuCl thermochemical cycle and could be adapted for use in other thermochemical cycles for producing hydrogen from water.

BRIEF DESCRIPTION OF THE DRAWINGS

The accompanying drawings are used to illustrate the present invention and should not be construed to limit the claims in any way.

FIG. 2.1 is a front view of a cross-section of a hydrogen production reactor;

FIG. 2.2 is a cross-sectional view of the hydrogen production reactor of FIG. 2.1;

FIG. 3.1 is a front view of a cross-section of an oxygen production reactor and includes an amplified view of a portion of the reactor;

FIG. 3.2(2) is a set of top cross-sectional views of the oxygen production reactor of FIG. 3.1 taken along lines A-A and B-B of FIG. 3.1, and an end view of a section of FIG. 3.1 taken along line C-C;

FIG. 3.2(1) illustrates schematically the feeder shown in FIG. 3.1 for the oxygen reactor;

FIG. 3.3(1) illustrates an enlarged front view of a cross section of a separation battle shown in FIG. 3.1;

FIG. 3.3(2) illustrates a top view of the separation baffle along line E-E in FIG. 3.1

FIG. 3.4 illustrates schematically the oxygen production reactor shown in FIG. 3.1 including the heating arrangement through a double shell structure;

FIG. 3.5 illustrates schematically the oxygen production reactor shown in FIG. 3.1 including the heating arrangement for heating CuCl outside the reactor;

FIG. 4.1 is a front view of a schematic diagram illustrating a molten salt collector used for molten salt processing and heat recovery;

FIG. 4.2 is a mix of views of the molten salt collector including a front view of a cross section through the collector and a top cross sectional view along line C-C in the upper part of the drawing in the Figure.

DETAILED DESCRIPTION OF THE INVENTION

The Closed Copper-Chlorine Thermochemical Cycle and its Heat Coupling Network

Figure 1:
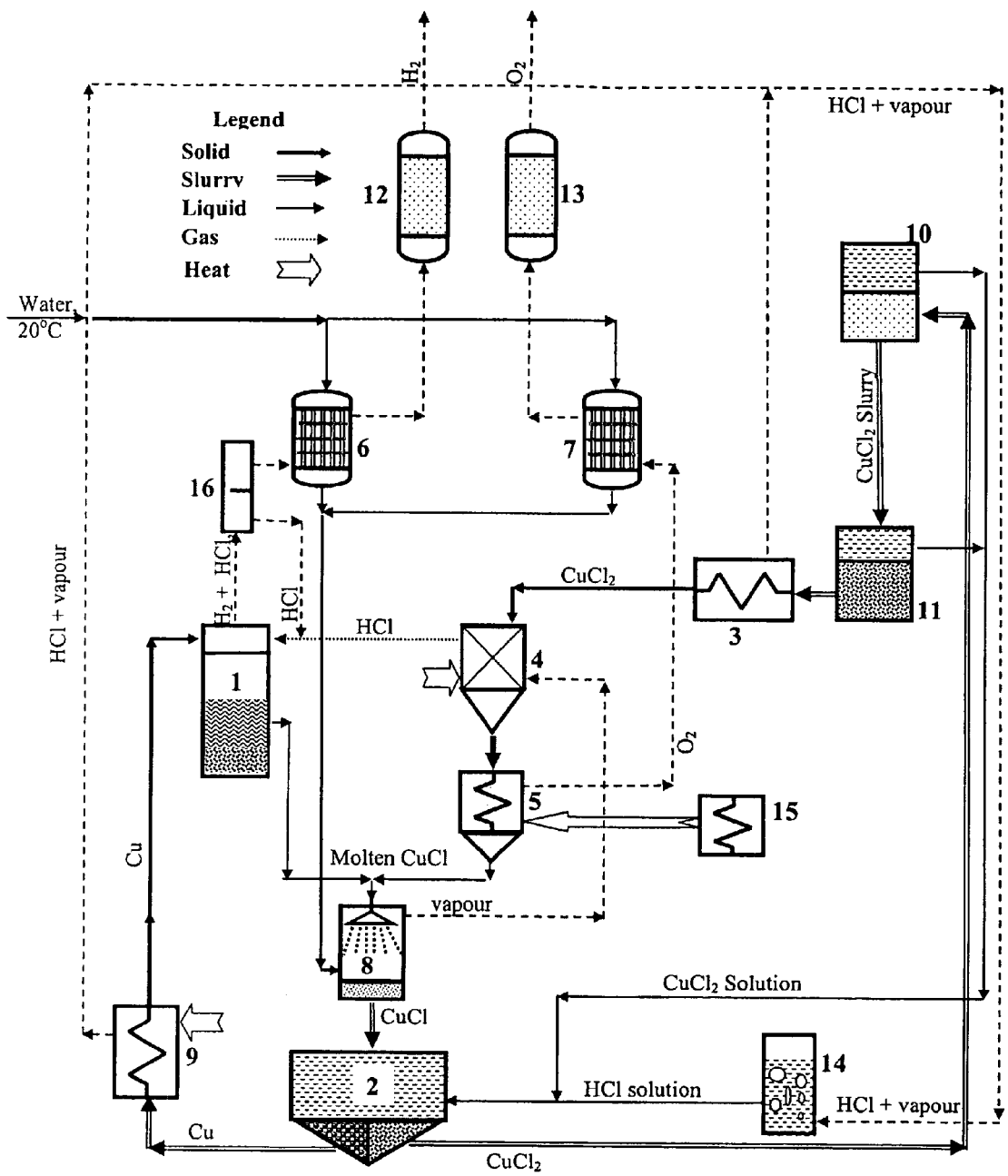
FIG. 1 is a schematic view of a system and apparatus for operating a five-step closed Cu—Cl thermochemical cycle for the production of hydrogen gas from water decomposition.
Figure 5:
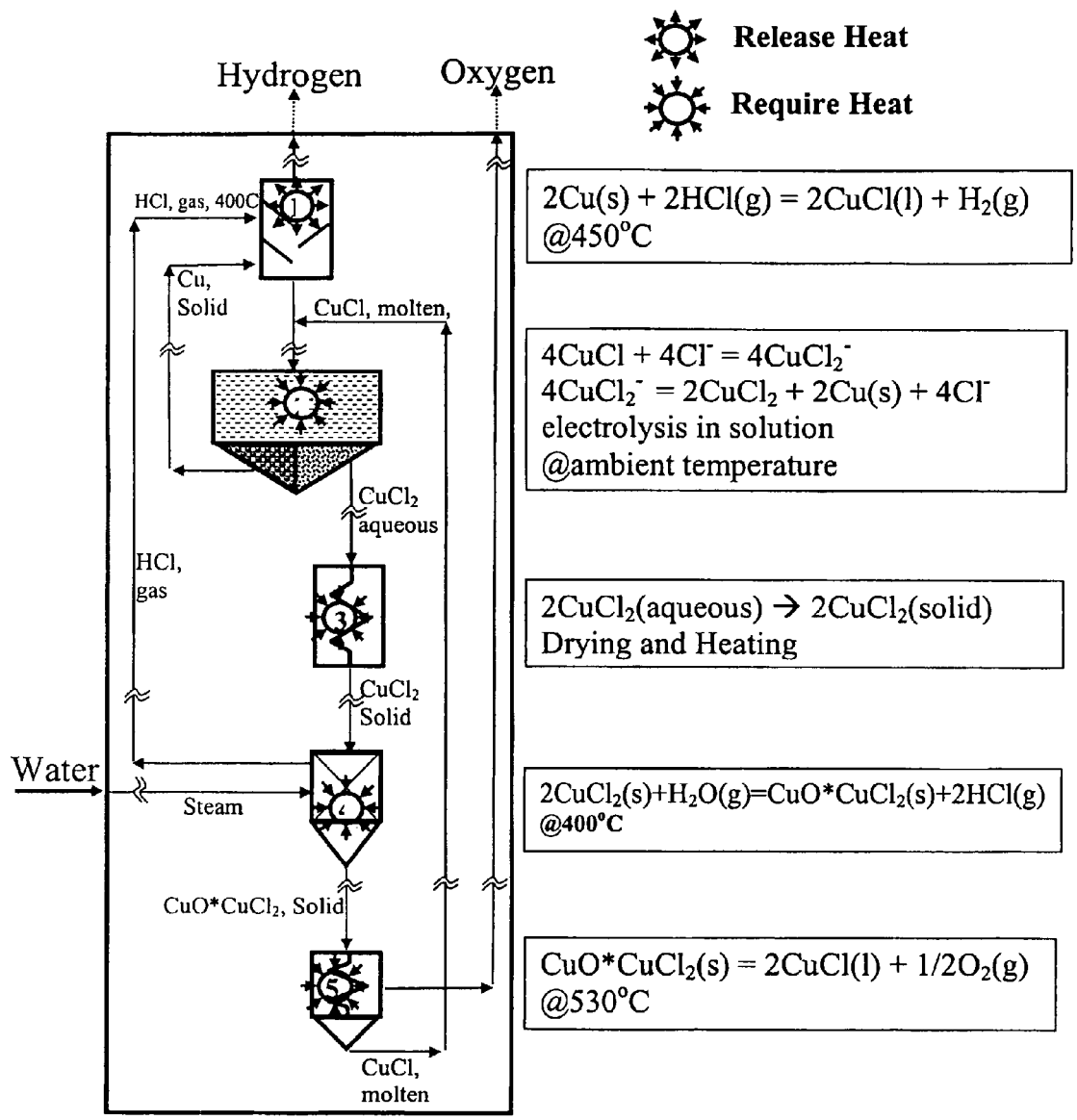
FIG. 5 is a simplified flow chart illustrating a five-step Cu—Cl thermochemical cycle for the production of hydrogen gas from the decomposition of water.

FIG. 1 is the detailed flow chart and FIG. 5 shows a simplified flow chart that shows the reactors, vessels, and the like, where each of the steps of the thermochemical five-step cycle occurs. The flexibility of the cycle is apparent in that a number of major steps can be combined in different ways to provide closed cycles of varying length and therefore steps. The following equations set out the reactions associated with each step of five-, four- and three-step cycles:

(1) Five-Step Cycle
1. $2Cu$ (solid)+$2HCl$ (gas)=$2CuCl$ (molten)+$H_2$ (gas) at about 450° C.
2. $4CuCl$ (solution)=$2Cu$ (solid)+$2CuCl_2$ (slurry) in HCl acid from about 70 to about 90° C.
3. $CuCl_2$+free water=$CuCl_2 \cdot nH_2O$ (solid)+water vapour (n could be an integer between 0 and 5) from about 30 to about 120° C.
4. $CuCl_2 \cdot nH_2O$ (solid)+$H_2O$ (steam)=$CuOCuCl_2$ (solid)+$2HCl$ (gas)+$nH_2O$ (gas) (n could be 0-5) from about 375 to about 450° C.
5. $CuOCuCl_2$ (solid)=$2CuCl$ (molten)+$0.5O_2$ (gas) from about 500 to about 530° C.

(2) Four-Step Cycle
Steps 4. and 5 of the five-step cycle can be combined to provide a four-step copper-chlorine cycle as follows:
1. $2Cu$ (solid)+$2HCl$ (gas)=$2CuCl$ (molten)+$H_2$ (gas) at about 450° C.
2. $4CuCl$ (solution)=$2Cu$ (solid)+$2CuCl_2$ (slurry) in HCl acid from about 70 to about 90° C.
3(a). $CuCl_2$+$H_2O$+free/associated $H_2O$=$CuOCuCl_2$ (solid)+$2HCl$ (gas)+$H_2O$ vapour from about 375 to about 450° C.
4(a). $CuOCuCl_2$ (solid)=$2CuCl$ (molten)+$0.5O_2$ (gas) from about 500 to about 530° C.

(3) Three-Step Cycle
Steps (3), (4) and (5) of the five-step cycle can be combined to provide a three-step copper-chlorine cycle as follows:
1. $2Cu$ (solid)+$2HCl$ (gas)=$2CuCl$ (molten)+$H_2$ (gas) at about 450° C.
2. $4CuCl$ (solution)=$2Cu$ (solid)+$2CuCl_2$ (slurry) in HCl acid from about 70 to about 90° C.
3(a). $CuCl_2$+$H_2O$+free/associated $H_2O$=$2CuCl$ (molten)+$0.5O_2$ (gas)+$H_2O$ vapour from about 500 to about 530° C.

Three-step or four-step thermochemical cycles have some major advantages compared with the five-step thermochemical cycle, for example, less equipment is required for the cycle; and the processing of liquid ($CuCl_2$ solution) is simpler than the processing of solid ($CuCl_2$ particles). However, some disadvantages are also introduced due to the combination of several steps, for example, heat grade is at higher temperature (>375° C.) than that of the five-step cycle (from about 30 to about 120° C.), which indicates less waste heat is used in three-step or four-step cycles; more heat is required to vaporize moisture; and there are more challenges to separate vapour from desirable gas products (e.g. HCl).

Advantages of the Copper-Chlorine Cycle

Compared with other thermochemical cycles (e.g. sulphur-iodine cycle), the copper-chlorine cycle described herein has advantages:

Lower Temperature Requirement:

The highest temperature requirement of the copper-chlorine cycle is 530° C., which is the lowest temperature requirement among hundreds of other thermochemical cycles. For example, the lowest temperature for the sulphur-iodine cycle is 850° C.

Lower Grade Heat can be Used and Recovered:

For example, in the drying step of copper-chlorine cycle, the heat could be as low as 70° C. The heat carried by molten CuCl can be efficiently recovered as well.

Flexible (3-Step, 5-Step) Number of Steps:

More than one step can be combined to overcome engineering design challenges and to simplify the process. In comparison, other cycles such as a sulphur-iodine cycle do not have this flexibility.

The details of the processes in the copper-chlorine cycle are described using the five-step cycle as a typical example. The four-step and three-step cycles are also described briefly where they are different from the five-step cycle. Referring now to FIG. 1 of the accompanying drawings which provides a schematic diagram of the arrangement of the apparatus used in the system of this invention, water, the only substance input of the cycle, firstly enters heat exchangers 6 and 7 in the form of a liquid at ambient temperature to recover the heat from hydrogen gas (denoted as $H_2$) at a temperature of about 450° C. and oxygen gas (denoted as $O_2$) at a temperature of about 530° C., which pass through the respective heat exchangers. Simultaneously $H_2$ and $O_2$ are cooled to ambient temperature in purifiers 12 and 13, respectively.

The processes taking place in heat exchangers 6 and 7 may be characterised by the following equations:

  (6) heat exchanger 6

  (7) heat exchanger 7

Cooling time is dependent on the flow rates of cooling water, $H_2$ gas and $O_2$ gas as well as the heat exchanger types and dimensions. Usually, the $H_2$ and $O_2$ can be cooled to ambient temperature within 5 minutes, typically 40 seconds.

At the outlets of each of the heat exchangers 6 and 7, the water temperature is much higher than ambient temperature, typically in the range of from about 60 to about 100° C. The hot water is pumped into a molten salt processing unit or steam generation column unit 8, wherein water is evaporated and heated to a temperature of about 375° C. In the said unit 8, the equations for the processes taking place are as follows:

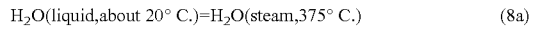  (8a)

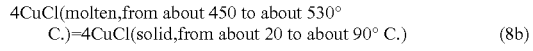  (8b)

Simultaneously, molten salt at about 450 to about 530° C. produced from hydrogen production reactor 1 and oxygen production reactor 5 is cooled and quenched in unit 8 to form a solid at a temperature of from about 20 to about 90° C. The time for cooling and quenching of molten CuCl salt using the hydrogen production reactor 1 is usually within 3 minutes, typically 70 seconds.

The quenched CuCl is then conveyed and fed into an electrolysis reactor 2, wherein cupric chloride ($CuCl_2$) and copper (Cu) at a temperature of from about 20 to about 90° C. are produced. The reactions taking place in the reactors 1 and 2 may be described by equations (1) and (2), respectively of the Cu—Cl cycle. The reaction time is in the range of from about 0.5 to about 7 hours, with the typical value being about 2.5 hours.

The copper produced in electrolysis reactor 2 is then conveyed with entrained water to dryer 9 where moisture is evaporated at from about 30 to about 120° C. The process taking place in the dryer 9 may be described by the following equation:

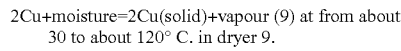 (9) at from about 30 to about 120° C. in dryer 9.

The drying time for copper is in the range of about 0.5 to about 6 hours, depending on the temperature and moisture. The higher the temperature, the shorter is the drying time. Where a typical range of moisture in copper particles is from about 10 to about 60% wt and the waste heat temperature is typically about 70° C., the drying time is about 2 hours using a fixed bed dryer or a fluidized bed dryer. The copper after drying is then conveyed and fed into the hydrogen production reactor 1 to produce hydrogen and the reaction taking place is described in equation (1) of the Cu—Cl thermochemical cycle.

The $CuCl_2$ produced in electrolysis reactor 2 exists in a solution or dilute slurry. The solution or dilute slurry is conveyed and fed into a crystallization cell 10 wherein the solution or dilute slurry is cooled to a lower temperature typically in the range of from about 20 to about 35° C. so that much more solid $CuCl_2$ precipitates. The process taking place in the said crystallization cell 10 may be characterised by the following equation:

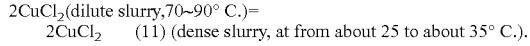 (11) (dense slurry, at from about 25 to about 35° C.).

The precipitation time for $CuCl_2$ is in the range of from about 0.5 to about 4 hours. The typical value is about 2 hours.

After exiting crystallization cell 10, the $CuCl_2$ precipitate goes into separation cell 11 wherein the precipitate is concentrated using natural sedimentation or centrifugal separation. The process taking place in separation cell 11 may be described by the following equation:

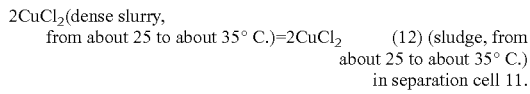 (12) (sludge, from about 25 to about 35° C.) in separation cell 11.

The time for sedimentation to obtain low moisture sludge is usually in the range of from about 4 to about 20 hours, depending on the moisture. The greater the moisture, the longer is the sedimentation time. A typical example of the sedimentation time for moisture of about 20% wt is about 6 hours.

The solution of $CuCl_2$ separated from crystallization and separation cells 10 and 11, respectively, is recycled to unit 2. The precipitate is an aggregation of sludge or mud and enters $CuCl_2$ drying cell 3 wherein the sludge is dried. It is understood that $CuCl_2$ may exist in the form of its hydrates, e.g., $CuCl_2.H_2O$ or $CuCl_2.2H_2O$, after drying the sludge.

The $CuCl_2$ or its hydrated form exiting drying cell 3 enters $CuCl_2$ hydrolysis reactor 4 wherein the hydrolysis reaction takes place to produce $CuOCuCl_2$ and HCl gas. The reaction is described in equation (4) of the Cu—Cl thermochemical cycle.

$CuOCuCl_2$ particles exiting the $CuCl_2$ hydrolysis 4 are then conveyed and fed into the oxygen production reactor 5, wherein the particles decompose to $O_2$ and molten CuCl. The process is described in equation (5) of the Cu—Cl thermochemical cycle. The decomposition time, or the life time of $CuOCuCl_2$ particles is in the range of about 20 seconds to about 2 hours, depending on the particle size. The larger the particle size, the longer the decomposition time. A typical example of the decomposition time is about 12 minutes for a particle size of 0.1 mm. The decomposition of $CuOCuCl_2$ requires heat, which can be provided by many ways (e.g., from the molten salt heat reservoir 15.)

HCl gas exiting $CuCl_2$ hydrolysis reactor 4 is then pumped and fed into the hydrogen production reactor 1 wherein $H_2$ and molten CuCl are produced after HCl reacts with Cu. The process taking place in reactor 1 is described by equation (1) of the Cu—Cl thermochemical cycle. The molten CuCl produced in hydrogen and oxygen production reactors 1 and 5 are fed into molten salt processing and steam generation unit 8. The process taking place in the steam generation column or molten salt processing unit 8 has been described above in equations (8-a) and (8-b). It is also noted that in the hydrogen gas exiting the hydrogen production reactor 1, unreacted HCl gas is present. $H_2$ is separated from HCl gas in an $H_2$—HCl separator 16 before entering the purifier 12.

In the drying processes described in equations (5) and (9) of the Cu—Cl cycle, the vapour and HCl after the drying are fed into reservoir 14. This way, the vapour and HCl are recycled. It is understood that in the Cu—Cl cycle the $CuCl_2$ solution or dilute slurry exiting the hydrolysis reactor 2 may be directly dried using other technology (e.g. spray drying). This way, referring to FIG. 1, cells 10, 11, 3 and their corresponding processes could be combined into fewer cells or even one cell.

It is noted that in the five-step copper-chlorine cycle, cells 3, 4, 10 and 11 can be combined to require fewer cells or even one cell where a process that may be described by the following equation 3-A takes place:

$$CuCl_2 + H_2O + \text{free/associated water} = CuOCuCl_2 \text{(solid)} + 2HCl\text{(gas)} + \text{water vapour at from about 375 to about } 450°C. \quad (3\text{-}A)$$

This way, a four-step copper-chlorine cycle is achieved. The feed of the reactor for reaction (3-A) of the four-step cycle is $CuCl_2$ solution, which is different from the input of anhydrous $CuCl_2$ or the hydrates of the five-step cycle.

Furthermore, cells 3, 4, 5, 10 and 11 can also be combined into fewer cells and even one cell where process 3-B takes place as described by the following equation:

$$CuCl_2 + H_2O + \text{free/associated water} = 2CuCl\text{(molten)} + 0.5O_2\text{(gas)} + \text{water vapour at from about 500 to about } 530°C. \quad (3\text{-}B)$$

The three-step copper-chlorine cycle involves the feed of the reactor for reaction (3-B) of the three-step cycle being the $CuCl_2$ rather than anhydrous $CuCl_2$ or the hydrates of $CuCl_2$ in a five-step cycle.

Description of Hydrogen Production Reactor

The hydrogen production reactor 1 is the reactor wherein hydrogen is produced. Illustrations of the reactor 1 are shown in FIGS. 2.1 and 2.2, where FIG. 2.1.1 is a front cross-sectional and FIG. 2.1.2 is a top cross-sectional view of the lower chamber of the hydrogen production reactor 1. The reaction is exothermic and may be described by equation (1), which takes place in chamber 1-14. There are many engineering challenges to scale up this reaction for industrial purposes. For example, two typical challenges are: (1) how to refresh the copper surface efficiently so that enough contact (time and area) between HCl and Cu can be provided; and (2) how to efficiently separate products and reactants. The design of the reactor 1 addresses and minimizes these difficulties.

Reactor 1 has three distinct features:

(1) The flow pattern for gaseous reactant HCl, gaseous product $H_2$, and molten product CuCl is a co-current downward flow. This way, molten CuCl is driven downward by HCl and $H_2$ immediately after it is produced. Hence, the surface of solid copper reactant can be continually refreshed. This way sufficient contact between reactants HCl and Cu is ensured and hence the reaction always takes place without being masked by CuCl.

(2) The structure of the reactor consists of layers of packings that may be inert material or the copper reactant itself. The copper could be in the form of pellets or a compacted aggregation of particles. The number of layers is flexible and the support of each layer may be a perforated plate or mesh.

(3) The structure of the reactor also includes a separation chamber at the reactor bottom wherein products and reactants are separated efficiently by gravity using a baffle structure which separates gas, liquid and solid products by virtue of their density differences.

The reaction temperature is in the range of from about 380 to about 500° C. The optimal temperature is selected to be slightly higher (typical value is about 450° C.) than the CuCl melting point (430° C.). At this temperature the solid CuCl passivation effect on the copper surface can be eliminated more efficiently so that the surface of the copper can be refreshed for more HCl reactant more efficiently. The temperature being higher than 450° C. can increase the reaction rate. However, operating at higher temperatures presents many challenges (e.g. the equipment material). Therefore, the hydrogen production reactor 1 is designed to operate in the range of from about 380 to about 500° C., but the equipment is most suitably operated at an optimal operation temperature of about 450° C.

Functions and Features of the Hydrogen Production Reactor

The structure of the reactor 1 is divided into two major chambers: a reaction chamber 1-14 and a separation chamber 1-10. In reaction chamber 1-14, the reaction described in equation (1) takes place and Cu reactant particles are fed through a Cu particles feeder 1-1 and HCl reactant gas is fed through an HCl feeder 1-3. After reaction, H. and molten CuCl are produced and then enter separation chamber 1-10 wherein $H_2$ is removed to an $H_2$—HCl separator 16 and molten CuCl is removed to steam generation column or molten salt processing unit 8 for further processing. To lower the environmental heat loss, insulation layer 1-17 is designed to surround the outside wall of the hydrogen production reactor 1.

Chamber 1-14 consists of a plurality of levels ranging, for example from 1 to 1000, depending on the production scale and pressure drop. The typical structure of each level is shown at 1-15 (Level A) and 1-16 (Level B). Each level includes perforated plates of varying structures as shown at 1-4 or 1-6. For example packing balls 1-5 are shown on the plate 1-4. The copper particles are distributed on each level and in the voids of the packing balls 1-5. The material of the plates 1-4 or 1-6 and balls 1-5 are selected to provide the required performance to withstand the operating conditions and reactants such as hydrogen embrittlement, the corrosive HCl and molten CuCl at 600° C. Furthermore, the plates 1-4 and 1-6 are selected to be strong enough to support the weight that the plates 1-4 and 1-6 must hold. In this reactor design, the plates 1-4 and 1-6 may be made of stainless steel with refractory ceramic or porcelain lining on the outside of the steel.

The reaction process can be briefly described as follows at each level. When hydrogen chloride flows downward and passes through the voids of the balls 1-5 and 1-6, it reacts with the copper particles at about 450° C., then the molten product CuCl, gas product $H_2$, and unreacted gas reactant HCl flow downward through the voids of the packing balls 1-5 and 1-6. During the downward flowing, more and more HCl is consumed and simultaneously more and more $H_2$ is produced. The ideal operation is that HCl is consumed completely before the reactants reach the separation chamber 1-9. To approach this goal, the height of the hydrogen production reactor 1 and the numbers of levels in the equipment are selected from high values. However, this is not considered to be economic and optimal, since the complete consumption of HCl is also controlled by the reaction equilibrium. Therefore, in the present design, the effluent gas mixture of $H_2$ and HCl flows out into separator 16 (see FIG. 1) that is designed for the separation of product $H_2$ from reactant HCl.

Cu particles become smaller and smaller as the reaction progresses. When the size of the particles is small enough, the particles may be entrained by the downward flow of molten CuCl to the lower levels of the reaction chamber 1-14. In the invention, the diameter of the holes of plates 1-4 and 1-6 on the upper plate levels is smaller than on lower levels and the size of packing balls 1-5 on the upper levels is also smaller than that on lower levels. This way the voids among packing balls 1-5 and holes on plates 1-4 and 1-6 decrease with the height of the reactor 1, and this corresponds to the size decrease of copper particles during the reaction. As a result, the entrainment of copper particles in molten CuCl can be greatly avoided because the molten CuCl continues to flow through the voids of packing balls 1-5 and plate 1-4 and 1-6 holes while copper particles are screened inside the voids and on the plates. It is understandable that the size of packing balls 1-5 on the top level 1-15 (Level A) of the reaction chamber 1-14 and the diameter of the holes in the plates 1-4 of the top level can be designed very small, or all levels may have the same sizes of packing balls and plate holes. The selection depends on whether the operation is safer, stable, reliable and predictable. For example, whether a uniform pressure drop can be provided and prevention of entrainment can be approached. Using the same sizes of packing balls and holes for all levels could make the pressure drop vary at each level, which would indicate an unstable operation and thus a safety issue. Therefore, the optimal design is the proposed design with various sizes of packing materials at different levels.

The packing balls and the plate holes may be of any shape and configuration. For example, the packing material may be rings and the cross section of the plate holes could be rectangular. The selection depends on whether the operation is safer, more stable, reliable and predictable. It is further understood that the layer consisting of packing balls could be any other mesh layer or filtration layer consisting of inert woven fabrics.

The packing balls themselves may be aggregated or solid blocks of copper particles themselves. This technology requires extra apparatus upstream of the reactor 1 and downstream of apparatus 9 to aggregate copper particles into bigger blocks. The cross section of the reactor 1 could be of any shape other than the circular shape as shown in FIG. 2.2. The selection depends on whether the operation is safer, more stable, reliable and predictable. A symmetrical shape has been adopted in the present design.

In the present design, feeding apparatus 1-1 is designed to feed copper particles to the top of reaction chamber 1-14. A screw feeder 1-1 may be used to feed the copper particles into reactor 1. Any other suitable type of feeder that can feed solid particles or sludge may be utilized here. To prevent reverse flow (or back flow) of HCl and $H_2$ from chamber 1-14 into the feeder 1-1 bypass 1-19 for HCl gas is designed for feeder 1-1 to provide a purging effect on copper particles. It operates at a pressure that is higher than that in reaction chamber 1-14. In the present design, another bypass 1-20 may also be included for 1-18 a copper particles purging cell, so that the copper particles are purged by HCl before the copper particles are conveyed into the feeder. In principle, the copper particles can be dried using other methods that are accompanied by explosion prevention measurements. For example, air may serve as heat carrier gas in the spray drying. However, if air is not stripped out of $CuCl_2$ particles, it may enter the hydrolysis reactor 4 to mix with product HCl, and this gas mixture then enters hydrogen production reactor 1. As a result, air may mix with $H_2$ in reactor 1, which may cause an explosion. The purging cell 1-18 may not be required if there is no oxygen or other oxidization gas entrained in the copper particles exiting from dryer 9 (See FIG. 1).

A feeder 1-2 for HCl gas is set below the feeding location of Cu particles as can be seen in FIG. 2.1. A cone shaped cap is shown at the HCl gas outlet. The main functions of the cap are to avoid falling of Cu particles into the HCl feeding pipe and distribute the copper particles uniformly on the plate using the HCl gas stream by the copper particles sliding downward along the cone of feeder 1-2. To ensure that the downward flow of Cu particles is unhindered, the cone angle α should not be larger than 180° and the choice is dependant on the HCl gas stream velocity and Cu particle size. The optimal range is from about 20 to about 120° and a typical value for the cone angle 2 is 60°.

Separation chamber 1-9 located below reaction chamber 1-14 is divided into two zones by a separation baffle 1-10: an $H_2$ removal and entrained Cu removal zone 1-21 and a molten CuCl removal zone 1-22. Separation chamber 1-9 is of larger diameter than reaction chamber 1-14 and the position of the separation baffle 1-10 is set so as not to be in line with a wall position W-W of reaction chamber 1-14. In this way, the quantity of the entrained copper particles (in molten CuCl) entering zone 1-22 is dramatically decreased.

The height of the separation baffle 1-10 depends on the size of entrained particles and the velocity of molten CuCl flowing over the top of separation baffle 1-10. The optimum value is higher than the bottom position (M-M) of molten CuCl removal pipe and lower than the center line (not shown, but apparent) of the molten CuCl removal pipe 1-11 so that separation baffle 1-10 also serves as a weir.

The function of pipe 1-11 is to remove the molten CuCl from zone 1-22 of separation chamber 1-9. The diameter of pipe 1-11 is large enough so that the molten CuCl level can overflow into the pipe 1-11 driven by gravity of the molten CuCl. Using this method the molten CuCl level inside chamber 1-9 is kept relatively constant. However, the pipe 1-11 could be also merged into the molten salt and a pump could be used to control the flow rate of molten CuCl so that the molten salt level can be controlled in separation chamber 1-9.

The height of zone 1-21 is high enough so that the Cu particles entrained in molten CuCl can be collected at the bottom of separation chamber 1-9 after natural sedimentation. The copper particles are then conveyed by for example, a screw conveyor 1-13 to the copper particles purging cell 1-18 located at the top of reaction chamber 1-14 for reuse.

The gas mixture of $H_2$ and HCl is removed through outlet 1-12 to the $H_2$—HCl separator 16. End point position (H-H) of outlet 1-12 in chamber 1-19 is located in the reaction chamber 1-14 so that it is not in line with or does not exceed the lower end wall (see line G-G) of reaction chamber 1-14. This way, the entrainment of downward flowing molten CuCl in the gas stream and hence the possible plug of 1-12 by molten CuCl is substantially eliminated.

Materials for Hydrogen Production Reactor

Reactor 1 contains several substances (e.g. HCl, molten CuCl, $H_2$) that are very corrosive to many metals at temperatures higher than 450° C. For example, HCl can react directly with many types of stainless steels and other metals at 450° C., $H_2$ has a significant embrittlement effect on many metals, and molten CuCl can create pits on the surfaces of many metals. In this invention, non-metal refractory material (e.g. ceramic or porcelain) is preferred and a typical material of the reactor wall 1-24 is fire brick that contains about 30 to about 80% aluminium oxide and about 30 to about 70% silicon dioxide. Metals may also be used if refractory ceramics or porcelains are used as lining material for the metal wall of the reactor 1 so that contact between corrosive substances and the metal wall can be prevented.

The material for insulation layer 1-17 can be of many types that are known to withstand temperatures higher than 450° C., e.g., mineral wools (fibre-glass, rock wool), minerals (vermiculite and perlite) or mixtures thereof.

The material for perforated plates 1-4 and 1-6 may be metal (typically stainless steel) with refractory ceramic or porcelain as lining on outer surfaces of the steel.

The material for separation baffle 1-10 and packing 1-5 may be selected from many types of material that withstand corrosion at temperatures higher than 450° C., e.g., porcelain, ceramic and borosilicate quartz. The typical borosilicate quartz balls used in the invention have the following composition: $SiO_2$ 81%, $Na_2O$ 4.0%, $K_2O$ 0.5%, $B_2O_3$ 13.0%, $Al_2O_3$ 2.0%.

Heat Coupling and Heat Recovery of the Hydrogen Production Reactor

As described above, the reaction is exothermic (energy releasing), which indicates the challenge that under stoichiometric operating conditions (strict definite ratios for reactant in reactions governed by the laws of conservation), the heat must be removed efficiently, and a large part of this heat will be wasted, and at the same time $H_2$ yield is low.

This conventional operation and thermal technology is shown below.

```
                            Heat
                          addition
                             ⇓                              1.6~2 CuCl,
  2 HCl, 375° C.   ┌────────┐  450° C.  ┌──────────────┐    450° C.
  ─────────────── →│ Heater │─────────→ │ H₂ production│ ───────────→
       Gas         └────────┘            │    reactor   │    molten
                                         │              │
                                         │              │     1.6~2 H₂,
  2 Cu, 30° C.     ┌────────┐  450° C.   │Stoichiometric│    450° C.
  ─────────────── →│ Heater │─────────→  │   process    │ ───────────→
       Solid       └────────┘            └──────────────┘       Gas
                             ⇑                    ⇓
                            Heat            Reaction heat
                          addition              removal
```

The typical calculation of the heat addition in the conventional operation is described as follows:
Process: $2Cu(solid) + 2HCl(gas) = (0\sim 2)CuCl(molten) + (0\sim 2) H_2(gas) + $ unreacted reactants,
at 450° C.
Reaction heat removal: $\Delta H_{removal} = Y \times \Delta H_{reaction} = Y \times 46.816$ kJ/mol,
where Y is the conversion of Cu or HCl. The value of Y is preferred to be higher than 80%.
Process: $2HCl(g, 375° C.) \rightarrow 2HCl(g, 450° C.)$
Heat addition to HCl: $\Delta H_{HCl} = 2*30.3*(450-375) = 4545$ J = 4.545 kJ,
where the average heat capacity value of HCl is adopted for simplification: $C_P^{HCl} \approx 30.3$ J/(mol·K) at 375-450° C.
Process: $2Cu(s, 30° C.) \rightarrow 2Cu(s, 450° C.)$
Heat addition to Cu: $\Delta H_{Cu} = 2*27.0*(450-30) = 22680$ J = 22.68 kJ,
Where the average heat capacity value of Cu is adopted for simplification: $C_P^{Cu} \approx 27.0$ J/(mol·K) at 30-500° C.

In this invention, hydrogen production reactor 1 can be operated under conditions where the reactants quantities are in excess of their stoichiometric values. This way, heat is efficiently recovered and product yield is simultaneously enhanced.

The copper and HCl feed rates can be controlled by feeders 1-1 and 1-3, respectively (see FIG. 2.1). Using an excess quantity of Cu or HCl, the yield of $H_2$ is improved and the reaction heat can be directly re-used. This way, heat is not removed from to the reactor 1 or provided to reactants outside the reactor 1. Consequently, there is a flexible range of the excess quantity of reactants corresponding to satisfactory $H_2$ yields at the same time.

This operation and thermal technology in this invention are shown below.

```
                           ✗ No heat
                             addition
   Cu, 30° C.                             2~4 CuCl, 450° C.
  2.5 times EXCESS    ┌─────────────┐        molten,
  ─────────────────→  │ Equipment 1 │  ───────────────────→
  From equipment 9    │             │    To equipment 8
                      │             │
   HCl, 350° C.       │ Our method  │    2~4 H₂, 450° C.
  ─────────────────→  └─────────────┘  ───────────────────→
  8 times EXCESS                            Gas
  From equipment 4                      To equipment 16
                         ✗ No heat     ✗ No heat
                           addition      removal
```

In this system, the excess amounts of HCl and Cu used in this process may be up to 8 times and 2.5 times their stoichiometric values, respectively. One typical calculation of the excess quantity of reactants for this invention is described as follows:
Net heat to be removed in conventional operation:
$\Delta H_{Net} = \Delta H_{reaction} - (\Delta H_{HCl} + \Delta H_{Cu}) = 46.816 - (4.545 + 22.68) = 19.591$ kJ
If the net heat is consumed by both products of $H_2$ and CuCl (molten), the temperature increase of the products is:
$\Delta T_{products} = \Delta H_{Net}/(C_P^{H_2} + 2*C_P^{CuCl}) = 19.591*1000/(30.0 + 2*63.0) \approx 126°$ C.,
then the temperature of molten CuCl and $H_2$ will go to $T_{products} = 450 + 126 = 576°$ C.

For the sake of safety and optimal operation, the reactor temperature is controlled to be kept at 450° C., then
$\Delta H_{Remove} = (C_P^{H_2} + 2*C_P^{CuCl})*(576-450) = (30.0 + 2*63.0)*126 = 19.656$ kJ,
where the excess quantity of HCl is:

$\Delta H_{Remove}/\Delta H_{HCl} = 19.656/4.545 \approx 4.3$ and the excess quantity of Cu is:

$\Delta H_{Remove}/\Delta H_{Cu} = 19.656/22.68 \approx 0.87$

The design of reactor 1 provides the ability to optimize and control the excess quantities of reactants. Using the reactor 1 and the heat recovery technology described herein, high quality heat released from the reaction at temperatures higher than 450° C. can be directly re-used in the reactor without the need to add additional high grade heat to the reactants to be dried and to reach the reaction temperature. Simultaneously, this provides flexibility to control the conversion of the reactant with the advantage that hydrogen yield can be enhanced through higher input of reactants than their stoichiometric quantities. One typical example is that the reactant Cu particles exiting the upstream dryer 9 usually have a temperature much lower than the required temperature of reaction (1) before copper particles enter the reaction chamber 1-14. In this process, the Cu is utilized in excess quantity and even Cu particles with moisture can be directly fed into the reactor so that incomplete drying of Cu is acceptable and Cu is not required to be heated outside the reactor.

HCl gas from the upstream $CuCl_2$ hydrolysis reactor 4 has a temperature lower than the temperature of reaction (1) of the Cu—Cl cycle. In the present process, the HCl can be controlled in excess quantity so that HCl is not required to be heated outside the reactor 1.

Oxygen Production Reactor

A schematic illustration of an oxygen production reactor 5 is shown in FIGS. 3.1, 3.2, 3.3, 3.4, and 3.5 of the accompanying drawings. FIG. 3.1 is a front assembly sectional view which illustrates the main construction of reactor 5. FIGS. 3.2 and 3.3 show detailed structure of the oxygen production reactor 5. FIGS. 3.4 and 3.5 illustrate simplified versions of reactor 5 which show the flexibility of the present heating methods. The reaction taking place in reactor 5 is endothermic (provides heat) and is described by equation (5) of the Cu—Cl cycle. The reaction temperature may be in the range of from about 430 to about 600° C.

There are many engineering challenges to overcome to industrialize reaction (5). For example, two typical challenges are: (1) thermal challenge: how to heat solid reactant $CuOCuCl_2$ particles efficiently and (2) separation challenge: how to separate different substances (products and reactants) in the multiphase flow system. The present design addresses all of these challenges. The molten product CuCl itself is used as a heat transfer medium to form a molten salt bath 5-12 within the reactor 5 and copper oxychloride ($CuOCuCl_2$, melanothallite) decomposes into oxygen ($O_2$) and cuprous chloride (CuCl) in the bath 5-12. The use of molten CuCl also allows flexible heating methods in that the molten CuCl can be heated either outside or inside the reactor 5.

The reactor 5 structure includes a separation baffle 5-1 which acts to prolong residence time of reactant particles by prohibiting the reactant particles from moving directly to the outlet 5-6. The separation baffle 5-1 can also efficiently separate products from reactant by gravity by virtue of density differences.

In the present process, the optimal temperature is selected to be about 530° C., which is 100° C. higher than the CuCl melting point (430° C.). At this temperature the solid CuCl passivation effect on the $CuOCuCl_2$ surface can be eliminated more efficiently so that the surface of $CuOCuCl_2$ can be refreshed for convection heat transfer more efficiently. At this temperature the $CuOCuCl_2$ reactant particles decompose fully. If the temperature is higher than 530° C., the vapour of CuCl is significant, which temperature should be avoided by the reactor design. In addition, higher temperatures bring many challenges (e.g. equipment material).

Functions and Features of Oxygen Production Reactor

The reactor can be divided into two major sections defined by separation baffle 5-1: Reactant feeding and reaction section 5-2 and products removal section 5-3. In section 5-2, $CuOCuCl_2$ reactant particles are fed into a molten salt bath 5-12 through feeder 5-4 and the reaction described in equation (5) of the Cu—Cl cycle takes place. After reaction, $O_2$ gas product is removed through outlet 5-5, which $O_2$ gas product is conveyed to heat exchanger 7. The molten product CuCl is removed through outlet 5-6 and then conveyed to steam generation column or molten salt processing unit 8 for further processing. To lower environmental heat loss, insulation layer 5-7 is designed to surround the outside wall of equipment 1. This is best seen in the enlarged view that is found in FIG. 3.1 of the drawings.

The structure of the solid reactant particles feeder 5-4 is shown in FIG. 3.2 (1). A hopper 5-20 contains $CuOCuCl_2$ particles that are received from $CuCl_2$ hydrolysis 4. A screw shaft 5-21 forces the solid particles to move downward into the reactor 5. In order to prevent decomposition of $CuOCuCl_2$ particles inside the feeder 5-4 due to heating from its high temperature environment, a double shell structure is provided and channel 5-22 is designed to allow lower temperature oxygen (<380° C.) to flow inside. This design has another advantage in that it can prevent reverse flow of oxygen and molten CuCl that are produced from the reaction.

End point 5-23 of the feeder can be at any depth relative of reactor 5 to the molten salt level (e.g., above or beneath the molten salt level 5-24) on condition that point 5-23 is lower than point 5-18 which is the top of separation baffle 5-1 so that the particles do not fall into zone or section 5-3 directly. Since the densities of both reactant particles and molten salt depend on temperature, the particles may ascend or descend in the molten bath depending on the temperature. The bulk density and possible aggregation of $CuOCuCl_2$ particles also influence the ascending or descending behavior.

May other types of feeders may be used in place of feeder 5-4 and the person skilled in the art would readily be able to select an appropriate alternative.

For safety consideration, mouths 5-16 and 5-17 located at the top of reactor 5 are designed so that they can be connected with a pressure relief valve or pressure rupture valve. The locations of mouths 5-16 and 5-17 are at opposite vertical sides of separation baffle 5-1. This way the sudden increase of pressure at either sides of baffle 5-1 can be relieved by either valve on mouths 5-16 or 5-17.

The detailed structure of the separation baffle 5-1 and its support mechanism is shown in FIG. 3.3. On the support plate 5-18, supporting rib 5-19 is designed to fix baffle 5-1 in place of the support plate. It is more advantageous that the separation baffle 5-1 is not located on the centre line F-F so that the space in section 5-2 is bigger than that in section 5-3 of the reactor 5 (see also FIG. 3.1). This way, enough space is provided for mixing and enough long residence time of reactant particles can be achieved.

The height of the separation baffle 5-1 in the reactor 5 depends on the size of entrained particles and the velocity of molten CuCl flowing through the bottom of the reactor 5. However, end point G-G must be set lower than the bottom wall of molten CuCl outlet pipe 5-6.

In the present design, the diameter of the pipe 5-6 is large enough so that the molten CuCl level can overflow and is driven by gravity of molten CuCl. Using this method the molten CuCl level inside reactor S is kept unchanged. However, the molten CuCl bath 5-12 also can be merged in the molten CuCl salt and a pump (not shown) can be used to control the flow rate of molten CuCl so that the molten salt level can be controlled.

Materials for Oxygen Production Reactor

In reactor 5, there are several substances (e.g. $O_2$, molten CuCl) that are very corrosive to many metals at temperatures around 530° C. For example, $O_2$ can oxidize many types of stainless steels and other metals at 530° C., and molten CuCl can create pits on the surface of many metals. In design, non-metal refractory material (e.g. ceramic or porcelain) is preferred and the typical material of the reactor internal walls 5-11 and external walls 5-8 is fire brick that contains about 30 to about 80% aluminium oxide and about 30 to about 70% silicon dioxide. Metal may also be used if a refractory ceramic or porcelain lining is used for the metal wall so that the contact between corrosive substances and the metal wall can be prevented.

The material for insulation layer 5-7 may be selected from many types that may withstand temperatures of about 530° C., e.g., mineral wools (fibre-glass, rock wool), minerals (vermiculite and perlite) or mixtures thereof.

The material for supporting plate 5-18 and separation baffle 5-1 is metal (typically stainless steel) with refractory ceramic or porcelain coating on the steel surfaces.

The material for outlets 5-5, 5-14 and 5-16 can be many types of stainless steel that will withstand $O_2$ oxidation at temperatures of about 530° C., e.g., G316 stainless steel. The material can be selected also from porcelain, ceramic and borosilicate quartz. In this invention, due to the brittle property of porcelain, ceramic or quartz, these materials are recommended to serve as lining for metal wall rather than they are used alone.

Heat Coupling Design and Thermal Solution

In the present system and process, the molten salt is the molten CuCl produced in the process. Using the CuCl produced as the molten salt bath is a significant advantage in the present system and process. Reaction (5) of the Cu—Cl cycle is endothermic and heat must be rapidly transferred to solid particles and the temperature must be kept uniform at the same time, which are usually big challenges in engineering. Using the molten CuCl bath, high heat transfer rate and efficiency can be achieved without introducing any additional heat transfer fluids or substances other than the resident reactants and products. In addition, the usual difficulties caused by the separation of products from auxiliary fluids or substances that have to be introduced as heat transfer medium can be eliminated. Natural separation of products from reactants and product from product can be achieved in keeping with the heat transfer goals.

The oxygen bubbles produced after the decomposition of $CuOCuCl_2$ will enhance the local rates of heat transfer by introducing more convection transfer. The mixing of $CuOCuCl_2$ (reactant) particles and molten CuCl (product bath) are enhanced and are more heterogeneously agitated by ascending bubbles. The possible aggregation of $CuOCuCl_2$ (reactant) particles is also reduced because the oxygen (product) bubbles can help to break up these aggregations. Due to the large density difference between oxygen and molten CuCl, the oxygen bubbles formed at the surface of the reactant particles will leave the surface immediately after the bubbles form, which ensures that the reaction is driven towards the direction of oxygen production. If necessary, agitation can be introduced into the bath. This approach would take advantage of both free and forced convection with heterogeneous mixing that facilitates both heat and mass transfer.

The present design in 5-12 using the molten bath provides good flexibility for methods to supply heat to molten bath 5-12. FIG. 3.1 shows the heating using a double shell structure for the reactor 5. Heating layer/channel 5-10 is designed to accommodate electrical induction or resistance wire. However, as the present design emphasizes energy efficiency, using a secondary flow of molten salt inside the heating channel 5-10 is most advantageous. The secondary flow is introduced through inlet 5-11 into channel 5-10. After the heat is transferred to the inner shell channel 5-11, the secondary flow leaves channel 5-10 and then goes back to molten salt heat reservoir 5-13 (see also FIG. 3.4).

Alternatively, the secondary flow of molten salt could be provided from a solar energy storage reservoir or nuclear heat exchanger, which uses molten salt as the heat storage and transferring medium.

Since molten CuCl itself can be the heat storage medium used in the solar energy reservoir, the molten CuCl can also be pumped out of the oxygen production reactor 5 to a solar energy reservoir and pumped back into the molten CuCl bath inside the reactor. The present design provides this flexibility as shown in FIGS. 5-1 and 5-5 wherein Bypass 5-15 and inlet 5-14 for secondary molten CuCl flow are illustrated. The location, structure and type of bypass 5-15 and inlet 5-14 can be arranged differently as needed. It is understandable that using the molten bath technology shown in FIG. 3.5, there is the flexibility that heating channel 5-10 present in FIG. 3.4 can be either shut off or operated to supply heat to the molten CuCl bath from the reactor wall.

This invention also provides the flexibility to use steam. In FIGS. 5-4 and 5-5, molten salt heat reservoir 5-13 can be a steam generator related to any station e.g. a power generating station. As well, steam can serve as the heating medium inside the double shell layer 5-10.

Molten Salt Processing and Heat Recovery Unit

The schematic illustration of the molten salt processing or heat recovery unit 8 is shown in FIGS. 4.1 and 4.2. FIG. 4.1 is a front view and FIG. 4.2 is an enlarged view of the molten salt collector 8 and a nozzle 6-3. The processes taking place in equipment 1 are steam generation and molten salt processing that are described in equations (8-a) and (8-b), respectively of the Cu—Cl cycle.

Molten salt processing and heat recovery create several engineering challenges. Two typical challenges are: (1) how to recover heat from the condensation and cooling of CuCl; and (2) how to generate CuCl particles that will be used in downstream step 2 and $CuCl_2$ dryer 2. Other challenges include water makeup, and molten salt collection. The design of the molten salt processing unit 8 minimizes and overcomes these difficulties because the molten CuCl is atomized and sprayed by steam. This way, more heat which is carried by molten CuCl can be recovered and CuCl particles are generated simultaneously.

Steam is generated as a result of the quenching of hot CuCl particles (either molten droplets or hot solid particles). This way, a large part of residual heat carried by the molten CuCl can be effectively recovered. The steam circulating apparatus attached to the molten salt processing unit 8 can provide different grade heat due to the requirement that involves adjusting the circulating flow rate back to the quenching tower 6-1.

The temperature of the molten salt exiting from hydrogen producing and oxygen producing reactors 1 and 5 respectively is in the range of about 450 to about 530° C. In unit 8, the molten salt CuCl is condensed and cooled to about 20 to about 90° C. by water. At same time, water is evaporated and heated to a temperature that is higher than about 375° C. The steam then goes to the $CuCl_2$ hydrolysis reactor 4 to serve as reactant. The slurry of solid CuCl and water in unit 8 are conveyed to reactor 4 to for electrolysis reaction.

The molten salt collector can be divided into eight major sections: a quenching tower 6-1, a molten salt collector 6-2, a molten slat nozzle 6-3, a steam circulating and heating apparatus 6-4, a steam outlets 6-5 and 6-6, a slurry (CuCl+water) conveyer 6-7, and a water makeup feeder 6-8. Outside the quenching tower 6-1, insulation layer 6-28 is designed to decrease heat loss to environment.

In the quenching tower 6-1, the molten salt CuCl droplets or solid CuCl particles at high temperature fall into the liquid water contained at the bottom of tower 6-1 and water vapour is then generated from the quenching of hot CuCl. Water vapour with lower temperature then moves upward to contact the downward falling droplets/particles of CuCl with higher temperature. In this counter current flow, the heat carried by CuCl transfers to the water vapour. As a result, the temperature of the water vapour increases with the upward flowing until reaching the top of tower 6-1. Then the steam is removed through outlets 6-6 or 6-5. Usually if outlet 6-6 is in use, then outlet 6-5 is shut off, and vise versa. Also usually, the use of outlets 6-6 or 6-5 is combined with the use of steam circulating and heating apparatus 6-4. If the steam circulating and heating apparatus is not utilized, the tower height will be much higher because apparatus 6-4 also serves to provide the atomization gas for nozzle 6-3 and the steam circulated by 6-4 is heated by the molten salt during the spraying process of molten CuCl. The design of this system provides good flexibility to use anyone of outlets 6-4, 6-5 and 6-6 through the setting of valves 9-13 for the outlets.

Through the control of either valve 6-11 or 6-12, steam leaves quenching tower 6-1 and enters buffer and settlement tank 6-24. In the tank, the steam pressure is buffered and then the steam is circulated to the steam chamber 6-18 of nozzle 6-3. Chamber 6-18 is of cyclone structure in which the steam flows downward spinning. After flowing outside of the steam mouth 6-25, the turbulent steam splits the downward flowing molten CuCl exiting from channel 6-20. This way, the molten CuCl is sprayed or atomized and at the same time steam extracts heat from molten CuCl.

In the operation of 6-4, if steam outlet 6-5 is used, then only part of the steam entering 6-4 is circulated and the rest of the steam is removed through outlet 6-5 with the outlet 6-6 being set off through the shutting of valve 6-10. However, if steam outlet 6-6 is used, then all steam entering 6-4 is circulated with the outlet 6-5 being set off through shutting off the valve 6-9.

The use of valve 6-11 or 6-12 is controlled by the required steam temperature that flows through outlet 6-5. The steam flowing through valve 6-12 has a temperature lower than the steam flowing through valves 6-10 and 6-11. If valve 6-12 is set off, then the temperature of steam flowing through 6-5 is higher than the case that the valve 6-11 is set off. However, the temperature of the steam flowing through outlet 6-10 is not influenced by which of valves 6-11 and 6-12 is used.

The optimal position of 6-26 (where valve 6-11 is set) is slightly higher than the atomization initiation position A-A. This can prevent the entrainment of CuCl particles/droplets in the gas stream entering outlet 6-26 and then entering the buffer and settlement tank 6-15. Tank 6-15 also serves as the settlement tank for the entrained particles from outlets 6-26 and 6-27. At a time interval the settled particles in 6-15 are removed to the CuCl$_2$ dryer 2 by apparatus 6-24, which is typically a screw conveyer.

Valve 6-13 is designed to control the flow rate of the circulated steam so that the spraying effect of CuCl in nozzle 6-3 can be adjusted. In addition, the heat recovery rate from molten salt can be adjusted and the steam temperature flowing through outlets 6-5 and 6-6 can be adjusted more instantly.

In the present design, the optimal temperature range of the steam flowing from outlets 6-5 and 6-6 is about 375° C. to about 530° C., which is higher than the critical point of water 374° C. In this temperature range, the steam can be compressed to any high preferred pressure for further use. It is understandable that the steam temperature that can be generated using this invention is not limited to from about 375° C. to about 530° C. It could be lower.

Molten salt CuCl exiting reactors 1 and 5 flows into molten salt collector 6-2 and then is further collected in reservoir 6-21. Apparatus 6-22 is designed for enough collection time and buffering effect so that entrained gas can be separated efficiently to the space 6-23. The structure from inlet 6-21 to inlet 6-20 is equivalent to a reducer which is advantageous to both the collection and atomization of molten CuCl. Between molten CuCl channel 6-20 and steam chamber 6-18, insulation layer 6-19 is designed so that the molten CuCl is not condensed by the flowing of steam.

The makeup quenching water is fed from 6-8. The mass flow rate of quenching water is controlled so that it is greater than the removal rate of steam from outlets 6-5 or 6-6, because some water is removed by the slurry removal apparatus 6-7 (e.g. screw conveyer type). The operation of apparatus 6-7 must comply with the criterion that the water level in quenching tower 6-1 is always lower than the position of water makeup apparatus 6-8.

Materials for Molten Salt Collector

In the molten salt collector 8, the major corrosive substance is molten CuCl at temperatures of from about 450 to about 530° C. that can create pits on the surface of many metals. In addition, although CuCl has low solubility in water, the solution is also corrosive to some metals if the solution temperature is higher than 50° C. In this design, non-metal refractory material (e.g. ceramic or porcelain) is preferred. The typical material for the walls of quenching tower 6-1, molten salt CuCl collector 6-21 and deflecting pipe 6-22 is fire brick that contains about 30 to about 80% aluminium oxide and about 30 to about 70% silicon dioxide. Metal can also be used if refractory ceramic or porcelain lining for the metal wall is used so that the contact between corrosive substances and the metal wall can be prevented.

The material for insulation layers shown at 6-19 and 6-28 can be of many types that may withstand temperatures of about 530° C., e.g., mineral wools (fibre-glass, rock wool), minerals (vermiculite and perlite) or their mix.

The material for buffer and settlement tank 6-15 is metal (typically stainless steel) with refractory ceramic or porcelain as lining for the steel.

The material for steam chamber 6-18 can be many types of stainless steels that withstand steam at temperature of 530° C., e.g., G304, G305, G316, G317 and G904 stainless steels. The material can be also porcelain, ceramic and borosilicate quartz. In this invention, due to the brittle property of porcelain, ceramic or quartz, these materials are recommended to serve as linings for metal walls rather than being used alone.

Heat Coupling Method, Flexibility and Optimization

Using the equipment of the invention, the heat carried by the molten salt CuCl can be efficiently recovered and the heat extracted from molten CuCl is sufficient enough to heat stoichiometric quantities of liquid water from 25° C. to superheated steam of 375° C. In the invention, the heat coupling criteria are given as follows:

The heat content of 2 moles of molten CuCl from the reactor 1 is recovered from 450° C. During the process of solidification, this molten salt undergoes three phase transitions from molten to β-hexagonal crystal (412-423° C., denoted as β) and then cubic (<412° C., denoted as C) crystal. The heat released during these phase transitions is calculated as follows:

$$2(\Delta H_{CuCl})_{450,liquid}^{25,solid,C} = \qquad (12)$$
$$2\{(\Delta H_{CuCl})_{450,liquid}^{423,liquid} + [(\Delta H_{CuCl})_{423,liquid}^{423,solid,\beta} + (\Delta H_{CuCl})_{423,solid,\beta}^{412,solid,\beta} + (\Delta H_{CuCl})_{412,solid,\beta}^{412,solid,C}] + (\Delta H_{CuCl})_{412,solid,C}^{25,solid,C}\}$$

where $$(\Delta H_{CuCl})_{450,liquid}^{423,liquid} = \int_{450}^{423} C_P^{CuCl,liquid} \, dT = -3.0 \text{ kJ} \qquad (13)$$

$$[(\Delta H_{CuCl})_{423,liquid}^{423,solid,\beta} + (\Delta H_{CuCl})_{423,solid,\beta}^{412,solid,\beta} + (\Delta H_{CuCl})_{412,solid,\beta}^{412,solid,C}] = \qquad (14)$$
$$-14.5 \text{ kJ}$$

$$(\Delta H_{CuCl})_{412,solid,C}^{25,solid,C} = \int_{412}^{25} C_P^{CuCl,solid,C} \, dT = -22.92 \text{ kJ} \qquad (15)$$

The heat required to supply the steam can be calculated from $$n_{H_2O}(\Delta H_{H_2O})_{25,liquid}^{375,vapor} \approx (\Delta H_{H_2O})_{25,liquid}^{375,vapor} \qquad (16)$$
$$\approx 57.8 \text{ kJ} \text{ (for } n_{H_2O} = 1 \text{ mol)}$$

In equations (12) to (16), $c_p$ is specific heat (kJ·mol$^{-1}$·K$^{-1}$), ΔH is enthalpy change (kJ), n is number of moles of the substance.

Equations (12) to (16) shows that the steam of 375° C. generated from water of 25° C. by extracting the heat of molten CuCl is 1.5 times larger than the stoichiometric value required in hydrolysis reaction (equation [4]). It is noted this 1.5 times is only the heat recovery quantity of molten CuCl produced from reactor 1. If also considering the heat recovery of the molten CuCl produced from reactor 5, the steam quantity of 375° C. will be more than 3 times of the stoichiometric value required in hydrolysis reaction (equation [4]) because the molten CuCl exiting equipment 5 is 530° C., which is higher than 450° C. exiting reactor 1. The feeding water from purifiers 6 and 7 that transfer heat from oxygen and hydrogen to water, allow a maximum steam quantity that can reach 4 times stoichiometric value required in a hydrolysis reaction (equation [4]).

The equations (12) to (16) also provide criteria for the quenching stage. The molten CuCl could be solidified before entering the water, or be solidified after entering the water. The operation conditions are determined by these equations.

If the heat recovery method described above used in the present system, another advantage is that other types of nozzles that use a double stream (liquid+gas) structure can be adopted if the gas stream is steam and the liquid is molten CuCl. Further, the invention also provides the flexibility of using or not using spray/atomization method. The operation conditions for using or not using spray/atomization method can be also determined by equations (12) to (16).

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the present disclosure as come within known or customary practice within the art to which the invention pertains and as may be applied to the essential features herein before set forth, and as follows in the scope of the appended claims.

The invention claimed is:

1. An apparatus for the production of hydrogen gas from the thermal decomposition of water using a Cu—Cl cycle comprising: an upper reaction chamber opening into a lower separation chamber of greater cross section than the upper reaction chamber; separate inlets for a solid reactant and a gaseous reactant in the upper reaction chamber, the solid reactant inlet being in communication with a solid reactant feeder, the gaseous reactant inlet being in communication with an adjustable gaseous reactant feeder that provides gas at a higher pressure than the pressure in the reaction chamber; the reactants and the reaction products flowing downwardly and concurrently through a plurality of filter layers, each of the filter layers comprising packing materials arranged on a perforated plate or mesh support, with the dimensions of the packing materials, the perforations and the mesh decreasing in size from top to bottom, from layer to layer, so that a uniform pressure drop is provided through each layer; the lower separation chamber being divided into two separation zones by a separation baffle whereby products and reactants are separated by virtue of their respective densities and by gravity; a first separation zone having an upper first outlet for removal of unreacted gaseous reactant and gaseous reaction product, and a lower second outlet for removal of unconsumed solid reactant; and a second separation zone having a third outlet positioned below the upper first outlet for removal of molten reaction product; wherein the first and third outlets, and the separation baffle are not in the area of the separation chamber into which the reaction chamber opens, so that unconsumed solid reactant can fall freely to the bottom of the first separation zone in the separation chamber through the molten reaction product and be removed therefrom.

2. The apparatus of claim 1 for use in the production of hydrogen gas from water decomposition using a thermochemical Cu—Cl Cycle in accordance with the following Equation (1):

$$2Cu(solid)+2HCl(gas)=2CuCl(molten)+H_2(gas) \quad (1)$$

at a temperature in the range of about 380° C. to about 500° C., wherein the reactants are solid Cu and HCl gas, and the reaction products are hydrogen gas, molten CuCl, and solid Cu entrained in molten CuCl.

3. The apparatus of claim 2, wherein the Cu—Cl cycle comprises five steps of:
1) reacting Cu and dry HCl gas at a temperature of about 450° C. to obtain hydrogen gas and molten CuCl salt;
2) subjecting solid CuCl and HCl to electrolysis at a temperature of about 70 to about 90° C. to obtain Cu and an aqueous slurry containing HCl and $CuCl_2$;
3) heating the aqueous slurry obtained from step 2) at a temperature of from about 375 to about 450° C. to obtain solid $CuCl_2$ and $H_2O$/HCl vapours;
4) heating the solid $CuCl_2$ and water to obtain solid $CuOCuCl_2$ and gaseous HCl; and
5) heating the solid $CuOCuCl_2$ obtained in step 4) at a temperature of from about 500 to about 530° C. to obtain molten CuCl salt and oxygen gas.

4. The apparatus of claim 2, wherein the Cu—Cl cycle comprises four steps of:
1) reacting Cu and dry HCl gas at a temperature of about 450° C. to obtain hydrogen gas and molten CuCl salt;
2) subjecting solid CuCl and HCl to electrolysis at a temperature of about 70 to about 90° C. to obtain Cu and an aqueous slurry containing HCl and $CuCl_2$;
3) heating the aqueous slurry obtained from step 2) at a temperature of from about 375 to about 450° C. to obtain solid $CuOCuCl_2$ and gaseous HCl; and
4) heating the solid $CuOCuCl_2$ obtained from step 3) at a temperature of from about 500 to about 530° C. to obtain molten CuCl salt and oxygen gas.

5. The apparatus of claim 2, wherein the Cu—Cl cycle comprises three steps:
1) reacting Cu and dry HCl gas at a temperature of about 450° C. to obtain hydrogen gas and molten CuCl salt;
2) subjecting solid CuCl and HCl to electrolysis at a temperature of about 70 to about 90° C. to obtain Cu and an aqueous slurry containing HCl and $CuCl_2$;
3) heating the aqueous slurry obtained from step 2) at a temperature of from about 500 to about 530° C. to obtain molten CuCl salt and oxygen gas.

6. The apparatus of claim 1 wherein the filter layers of packings are comprised of inert materials or a solid reactant which provides at least some of the solid reactant in the reaction.

7. The apparatus of claim 6 wherein the packings are balls or cylinders or rings made of inert or solid reactant material.

8. The apparatus of claim 1, further comprising a gas production reactor for the production of oxygen gas from water decomposition using a thermochemical Cu—Cl cycle comprising two major sections, a first reactants feeding and reaction section and a second products removal section; a feeder inlet for solid reactant in the first section, a second gas outlet at the top of the gas reactor and an outlet for hot liquid reaction product in the second section of the gas reactor, located at a position below the position of the feeder inlet for solid reactant, the first section extending into a base of the reactor and supplying heat to the reactor for the reaction; a hot liquid reaction product bath of the solid reaction product being maintained in the reactor to ensure a high heat transfer rate and efficiency for the reaction.

9. The apparatus of claim 8 wherein the feeder inlet has an associated feeder which comprises a hopper for the solid reactant, a screw to force the solid reactant into the first section of the gas production reactor, and a double shell structure for the feeder in which lower temperature gas produced from the reaction flows through to ensure that the solid reactant remains in solid form in the feeder and to prevent reverse flow of the reactants into the feeder.

10. The apparatus of claim 9 wherein the heat input for the insulated gas production reactor is provided by at least one of the following: a heating jacket, a secondary hot liquid reaction product/steam flow from inside the insulated gas production reactor to a double shell surrounding the insulated gaseous production reactor, a secondary flow of hot liquid reaction product from outside the insulated gaseous production reactor; and a flow of steam to the heating channel.

11. The apparatus of claim 10, wherein the secondary liquid/steam flow circulates in the heating channel of the insulated gas production reactor and flows out and to a liquid molten salt heating reservoir and then back to the heating channel of the gas production reactor.

12. The apparatus of claim 11, further comprising a quenching tower for receiving a hot liquid product, a generator for producing steam in the tower, and a supply of water at ambient temperature, the steam and the hot liquid reaction product being processed and then exposed to the ambient temperature water to produce a slurry of solid reaction product and steam.

13. The apparatus of claim 12 wherein the quenching tower is insulated and has an associated hot liquid reaction product collector in which hot liquid streams can be collected together before being fed into a top portion of the quenching tower; steam outlets are provided in a top portion of the quenching tower; a slurry outlet is provided in a base portion of the tower, and a water make-up inlet is provided in the quenching tower.

14. The apparatus of claim 13, further comprising a steam circulating and heating apparatus comprising a buffer and a settlement tank, the settlement tank permits the steam under pressure from the tower to be circulated to a steam chamber with an associated nozzle, in which the steam can flow downwardly and spin in the steam chamber to produce turbulent steam flow to split the downwardly flowing hot liquid reaction product entering the quenching tower, which can be sprayed or atomized, whereby the steam extracts more heat from the hot liquid reaction product.

15. A process for producing hydrogen gas from water decomposition using the apparatus of claim 1 in the thermochemical Cu—Cl cycle, wherein Cu and dry HCl gas are reacted at a temperature of about 450° C. to obtain hydrogen gas and molten CuCl salt; providing a supply of hydrogen chloride gas as the gaseous reactant and a feed of solid copper as the solid reactant arranged so that gaseous reactant HCl gaseous product $H_2$ and molten CuCl flow concurrently downwardly through at least one filter layer of inert material or copper, which ensures that the molten CuCl is driven downward by the $H_2$ and HCl gases as soon as the molten CuCl is produced and further ensures that the solid copper reactant surface can be continually refreshed and is not masked by the molten CuCl; the filter layers being of finer size in the downward direction, in each layer or in each lower layer or a combination of such layers; separating the reaction products and reactants beneath the level of the reaction in the separation zones by gravity and providing the separate outlets for the gases, the molten CuCl salt and the molten CuCl salt with entrained copper, and locating the outlets at different heights and by baffling the gas, liquid and solid products to aid further in separating the reaction products and reactants by virtue of their density differences.

16. A process as claimed in claim 15, wherein excess amounts of HCl and Cu selected from amounts in the range of from about 2.5 to about 8 times their stoichiometric values to provide heat to the reaction thereby reducing outside heat requirements.

17. A process for producing hydrogen gas from water decomposition using a thermochemical Cu—Cl cycle, wherein solid $CuOCuCl_2$ is heated at a temperature of from about 500 to about 530° C. to obtain molten CuCl salt and oxygen gas; providing a first reactants feeding and reaction section with a feed for $CuOCuCl_2$ reactant particles; providing an oxygen gas outlet at the top of the first section; providing a second products removal section with an outlet for molten CuCl at a position lower than the $CuOCuCl_2$ reactant feed; the reaction in the first section providing heat to the reaction; and a molten CuCl salt bath maintained for the reaction section to ensure a high heat transfer rate and efficiency of the reaction.

18. A process as claimed in claim 17, further comprising providing insulation means for supplying and maintaining heat for the first section.

19. The apparatus of claim 1, wherein from 2 to 1000 layers are present, the number depending on production scale and pressure drop required for operation of the apparatus and the supporting plates are made of stainless steel with refractory ceramic or porcelain lining on the steel.

20. The apparatus of claim 1, further comprising a bypass for the solid reactant feeder to provide a purging effect on the solid reactant, the bypass being operable at a higher pressure than the pressure in the reaction chamber.

21. The apparatus of claim 1, further comprising a purging cell for the solid reactant feeder to purge the solid reactant with gaseous reactant before the solid reactant is fed to the feeder.

22. The apparatus of claim 1, wherein the gaseous reactant feeder opens into the reaction chamber at a position below the solid reactant feeder and has a cap to prevent solid reactant from entering the inlet and to distribute solid reactant within the reaction chamber.

23. The apparatus of claim 1 wherein the reaction chamber is insulated.

24. The apparatus of claim 1, wherein the separation baffle extends upwardly from the base of the separation chamber and is high enough to create a zone for collecting by gravitational sedimentation unreacted solid reactant in molten reaction product, and is at a higher position than a bottom position of the molten reactant outlet and lower than a centre line of the molten reactant outlet so as to create a weir for removal of the molten reaction product.

25. The apparatus of claim 24 wherein a screw conveyor is used to remove the unreacted solid reactant from the separation chamber.

26. The apparatus of claim 24, wherein the molten reaction product outlet extends into the area of the separation chamber where unreacted solid reactant and molten reaction product are collected and a pump is used to remove the molten reaction product.

27. An apparatus for use in the production of hydrogen gas and oxygen gas from water decomposition using a thermochemical Cu—Cl Cycle comprising: a hydrogen gas generator operating in accordance with the following Equation (1):

$$2Cu(\text{solid}) + 2HCl(\text{gas}) = 2CuCl(\text{molten}) + H_2(\text{gas}) \qquad (1)$$

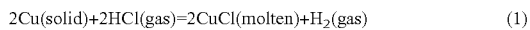

at a temperature in the range of about 380° C. to about 500° C. comprising: an upper reaction chamber opening into a lower separation chamber of greater cross section than the cross section of the upper reaction chamber; separate inlets for the solid Cu reactant and a dry HCl gas reactant in the upper reaction chamber, with the solid Cu reactant inlet being in communication with a feeder for solid Cu reactant, the dry HCl gaseous reactant inlet being in communication with an adjustable dry HCl gaseous reactant feeder that provides gas at a higher pressure than the pressure in the reaction chamber; the solid Cu and dry gaseous reactants and the reaction products $H_2$ and molten CuCl flowing downwardly and concurrently through a plurality of filter layers, each of the filter layers comprising packing materials arranged on a perforated plate or mesh support, with the dimensions of the packing materials, the perforations and the mesh decreasing in size from top to bottom of the plurality of layers, so that a uniform pressure drop is provided through each layer; the lower separation chamber being divided into two separation zones by a separation baffle whereby products and reactants are separated by virtue of their respective densities and by gravity; a first separation zone having an upper first outlet for removal of unreacted gaseous reactant and gaseous reaction product, and a lower second outlet for removal of unconsumed solid reactant; and a second separation zone having a third outlet positioned below the upper first outlet for removal of molten CuCl salt; wherein the first and third outlets, and the separation baffle are not in the area of the separation chamber into which the reaction chamber opens, so that unconsumed solid copper can fall freely to the bottom of the first separation zone in the separation chamber through the molten CuCl salt and be removed therefrom; a quenching tower wherein steam generation and molten salt processing can be conducted such that water at ambient temperature can be exposed to molten CuCl to produce a slurry of solid CuCl and steam; a reactor for oxygen gas production operated in accordance with Equation (5) of the thermochemical Cu—Cl cycle:

$$CuOCuCl_2(\text{solid}) = 2CuCl(\text{molten}) + 0.5O_2(\text{gas}) \quad (5)$$

the $CuOCuCl_2$ (solid) heated at a temperature of from about 500° C. to about 530° C.; the reactor comprising two major sections, a first reactants feeding and reaction section and a second products removal section defined by a separation baffle; a feeder inlet for reactant particles in the first section, a gas outlet at the top of the reactor and an outlet for liquid reactant in the second section of the reactor, the liquid reactant outlet being located at a position below the position of the feeder inlet for solid particles, and above the base of the separation baffle; the first section extending into the base of the production reactor and supplying heat to the production reactor for the reaction; a molten salt bath of the CuCl reaction product being maintained in the oxygen gas production reactor to ensure high heat transfer rate and efficiency for the reaction; and an apparatus for steam circulating and heating comprising a buffer and a settlement tank associated with a nozzle, for receiving steam from the tower steam chamber, in which the steam can flow downwardly and spin in the steam chamber to produce turbulent steam which can split downwardly flowing molten CuCl product entering the quenching tower, which can be sprayed or atomized, and the steam extracts more heat from the molten CuCl product.

* * * * *